United States Patent
Donjerkovic et al.

(10) Patent No.: US 11,836,136 B2
(45) Date of Patent: *Dec. 5, 2023

(54) DISTRIBUTED PSEUDO-RANDOM SUBSET GENERATION

(71) Applicant: ThoughtSpot, Inc., Mountain View, CA (US)

(72) Inventors: Donko Donjerkovic, San Mateo, CA (US); Prateek Gaur, San Jose, CA (US); Eric Musser, Redwood City, CA (US)

(73) Assignee: ThoughtSpot, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/075,665

(22) Filed: Dec. 6, 2022

(65) Prior Publication Data

US 2023/0117794 A1     Apr. 20, 2023

Related U.S. Application Data

(63) Continuation of application No. 17/223,999, filed on Apr. 6, 2021, now Pat. No. 11,580,111.

(51) Int. Cl.
    *G06F 16/2455*     (2019.01)
    *G06F 16/22*     (2019.01)
    *G06F 16/248*     (2019.01)

(52) U.S. Cl.
    CPC ...... *G06F 16/2456* (2019.01); *G06F 16/2282* (2019.01); *G06F 16/248* (2019.01)

(58) Field of Classification Search
    None
    See application file for complete search history.

(56) References Cited

U.S. PATENT DOCUMENTS

| | | |
|---|---|---|
| 5,649,591 A | 7/1997 | Green |
| 8,577,913 B1 | 11/2013 | Hansson et al. |

(Continued)

FOREIGN PATENT DOCUMENTS

| | | |
|---|---|---|
| EP | 268367 A2 | 5/1988 |
| EP | 1587011 A1 | 10/2005 |

(Continued)

OTHER PUBLICATIONS

Sayyadian et al., "Efficient Keyword Search Across Heterogeneous Relational Databases", 2007, IEEE, 346-355 (10 pp).

(Continued)

*Primary Examiner* — Dawaune A Conyers
(74) *Attorney, Agent, or Firm* — Young Basile Hanlon & MacFarlane, P.C.

(57) ABSTRACT

Distributed pseudo-random subset generation includes obtaining a data-query indicating a first table having a first column including unique values, a second table having a second column including unique values, a join clause joining the first table and the second table on the first column and the second column, and a limit value, pseudo-random filtering the first table to obtain left intermediate data and left filtering criteria, pseudo-random filtering the second table to obtain right intermediate data and right filtering criteria, obtaining intermediate results data by full outer joining the left intermediate data and the right intermediate data, obtaining results data by filtering the intermediate results data using most-restrictive filtering criteria among the left filtering criteria and the right filtering criteria, and outputting the results data, wherein outputting the results data includes limiting the cardinality of rows of the results data to be at most the limit value.

20 Claims, 5 Drawing Sheets

(56) References Cited

U.S. PATENT DOCUMENTS

| | | | |
|---|---|---|---|
| 9,275,132 | B2 | 3/2016 | Roberts et al. |
| 9,305,034 | B2 | 4/2016 | Kemmler et al. |
| 9,405,794 | B2 | 8/2016 | Prakash et al. |
| 9,430,547 | B2 | 8/2016 | Lightner et al. |
| 2004/0267730 | A1 | 12/2004 | Dumais et al. |
| 2005/0027717 | A1 | 2/2005 | Koudas et al. |
| 2005/0289124 | A1 | 12/2005 | Kaiser et al. |
| 2006/0167865 | A1 | 7/2006 | Andrei |
| 2007/0192300 | A1 | 8/2007 | Reuther et al. |
| 2007/0219974 | A1 | 9/2007 | Chickering et al. |
| 2008/0109422 | A1 | 5/2008 | Dedhia |
| 2008/0262999 | A1 | 10/2008 | Helsen et al. |
| 2009/0019019 | A1 | 1/2009 | Jones et al. |
| 2009/0019022 | A1 | 1/2009 | Schallert et al. |
| 2010/0017395 | A1 | 1/2010 | Wayn et al. |
| 2011/0113048 | A1 | 5/2011 | Njemanze |
| 2012/0066217 | A1 | 3/2012 | Eder |
| 2012/0254251 | A1 | 10/2012 | Barbosa et al. |
| 2013/0339370 | A1 | 12/2013 | Holstege et al. |
| 2014/0052713 | A1 | 2/2014 | Schauer et al. |
| 2014/0201241 | A1 | 7/2014 | Wood et al. |
| 2014/0297653 | A1 | 10/2014 | Liu et al. |
| 2014/0337371 | A1 | 11/2014 | Li |
| 2015/0026153 | A1 | 1/2015 | Gupta et al. |
| 2015/0220573 | A1* | 8/2015 | Attaluri ............. G06F 16/24553 707/690 |
| 2016/0224542 | A1 | 8/2016 | Bulgakov et al. |
| 2017/0270159 | A1 | 9/2017 | Wang et al. |
| 2019/0065604 | A1 | 2/2019 | Gupta et al. |
| 2020/0220573 | A1 | 7/2020 | Baek et al. |
| 2020/0250163 | A1 | 8/2020 | Kuimelis et al. |
| 2021/0089530 | A1 | 3/2021 | Anand et al. |

FOREIGN PATENT DOCUMENTS

| | | |
|---|---|---|
| EP | 2202658 A2 | 6/2010 |
| EP | 2207106 A2 | 7/2010 |
| EP | 2885730 A1 | 6/2015 |
| EP | 3654204 A1 | 5/2020 |
| WO | 0141002 A1 | 6/2001 |
| WO | 2015009353 A1 | 1/2015 |

OTHER PUBLICATIONS

Wu et al: "Towards Keyword-Driven Analytical Processing", Proceedings of the 2007 ACM Sigmod International Conference on Management of Data, Sigmo '07, Jun. 12, 2007, (12 pp).

Shi et al.: "50x Faster: Speeding Up an SQL-Based Legacy System With Few Changes", Oct. 4, 2011 Retrieved from Internet: URL: http://www.user.tu-berline.de/komm/CD/paper/040221.pdf [retrieved on Jun. 11, 2014]. (12 pp).

Blunschi et al: "SODA: Generating SQL for Business Users", Proceedings of the VLDB Endowment, vol. 5, No. 10, Aug. 27, 2012 pp. 932-935 (12 pp).

Baid et al: "Toward Scalable Keyword Search over Relational Data", Proceedings of the VLDS Endowment, vol. 3, No. 1-2, Sep. 1, 2010, pp. 140-149 (10 pp).

Li et al: "Efficient Type-Ahead Search on Relational Data: a TASTIER Approach", Sigmod-Pods '09: Compilation Proceedings of the International Conference on Management Data & 28th Symposium on Principles of Database Systems; Providence, RI,USA, Association for Computing Machines, New York NY Jun. 29, 2009, pp. 695-706 (12 pp).

Morton, K., et al., "Dynamic Workload Driven Data Integration in Tableau", Proceedings of the 2012 International Conference on Management of Data, SIGMOD '12, Jan. 1, 2012, p. 807 (9 pp).

Jajodia et al., "Flexible Support for Multiple Access Control Policies", ACM Transactions on Database Systems, ACM New York, NY, USA, vol. 26, No. 2, Jun. 1, 2001, pp. 217-228 (48 pp).

International Search Report and Written Opinion for PCT/US14/39230; dated Nov. 24, 2014 (16 pp).

Anonymous: "File System Permission—Wikipedia, The Free Encyclopedia." Jun. 11, 2013 (Jun. 11, 2013); URL: http://en.wikipedia.org/w/index/php?title.sub.-File.sub.-system.sub.-p-ermissions &oldid=559455322 [retrieved on May 11, 2014]; (8 pp).

Anonymous, "Natural Language Processing", Wikipedia, Downloaded Jan. 30, 2019, https://en.wikipedia.org/wiki/Natural_language_processing, (8 pp).

Seif, G., "An Easy Introduction to Natural Language Processing—Using Computers to Understand Human Language", Oct. 1, 2018 (Downloaded Jan. 30, 2019), https://towardsdatascience.com/an-easy-introduction-to-natural-language-processing-b1e2801291c1, (11 pp).

Avrach, A., thoughtspot.com, "What the Bleep is a Chasm Trap?", https://www.thoughtspot.com/fact-and-dimension/what-bleep-chasm-trap 9/, Date Unknown, Downloaded Apr. 2, 2019 (9 pp).

Sisense, "Chasm and Fan Traps", https://documentation.sisense.com/latest/managing-data/working-with-data/chasm-fan-traps.htm, Date Unknown, Downloaded Apr. 2, 2019 (8 pp).

Thoughtspot, "Chasm Traps", https://docs.thoughtspot.com/4.4/admin/loading/chasm-trap.html, Version 4.4 Guides, Date Unknown, Downloaded Apr. 2, 2019 (4 pp).

Extended European Search Report received in co-pending Application No. EP 19160657.3 dated Apr. 4, 2019 (11 pp).

Eades, Peter, et al., "A Fast & Effective Heuristic for the Feedback Arc Set Problem," Information Processing Letters, vol. 47, Issue 6, Oct. 18, 1993, pp. 319-323.

Wikipedia, "Dijkstra's algorithm", Date Unknown, downloaded Jul. 16, 2019, https://en.wikipedia.org/wiki/Dijkstra%27s_algorithm (11 pp).

Wikipedia, "Consistent hashing", https://en.wikipedia.org/wiki/Consistent_hashing, Date Unknown, Downloaded Aug. 15, 2019, (5 pp).

Extended European Search Report dated Jul. 26, 2019, issued in co-pending EP Application No. 19166422.6 (11 pp).

Anonymous, "What is a bitmask and a mask?—Stack Overflow", Nov. 9, 2018, pp. 1-7, Retrieved on Jul. 8, 2022 from URL: https://web.archive.org/web/20181109150100/https://stackoverflow.com/questions/31575691/what-is-a-bitmask-and-a-mask.

\* cited by examiner

DISTRIBUTED PSEUDO-RANDOM SUBSET GENERATION

CROSS-REFERENCE TO RELATED APPLICATIONS

This application is a continuation of U.S. patent application Ser. No. 17/223,999, filed Apr. 6, 2021, the entire disclosure of which is incorporated by reference herein.

BACKGROUND

Advances in computer storage and database technology have led to exponential growth of the amount of data being created. Businesses are overwhelmed by the volume of the data stored in their computer systems. Existing database analytic tools are inefficient, costly to utilize, and require substantial configuration and training.

SUMMARY

Disclosed herein are implementations of methods and systems for distributed pseudo-random subset generation.

An aspect of the disclosure is a method for distributed pseudo-random subset generation. Distributed pseudo-random subset generation may include receiving data expressing a usage intent with respect to a low-latency data analysis system, wherein the low-latency data analysis system includes a distributed in-memory database. Distributed pseudo-random subset generation may include, in response to receiving the data expressing the usage intent, obtaining, by the distributed in-memory database, a portion of a data-query responsive to the data expressing the usage intent, wherein the portion of the data-query indicates a first table from the distributed in-memory database, the first table having a first column, a second table from the distributed in-memory database, the second table having a second column, a join clause indicating a full outer join of the first table and the second table on the first column and the second column, and a limit value. Distributed pseudo-random subset generation may include obtaining an unrestricted bitmask and obtaining a restricted bitmask that is minimally more restrictive than the unrestricted bitmask. Distributed pseudo-random subset generation may include pseudo-random filtering the first table using the unrestricted bitmask as a weak bitmask, the restricted bitmask as a strong bitmask, a first counter as a current counter, and data from the first table as candidate data, which includes using the first column as a target column. Distributed pseudo-random subset generation may include pseudo-random filtering the second table using unrestricted bitmask as the weak bitmask, the restricted bitmask as the strong bitmask, a second counter as the current counter, and data from the second table as the candidate data, which includes using the second column as the target column. Pseudo-random filtering may include, in response to a determination that the candidate data includes an unevaluated row, identifying the unevaluated row as a current row, wherein the current row includes a current value for the target column, wherein the current value is unique within the target column. Distributed pseudo-random subset generation may include identifying the current row as an evaluated row. Distributed pseudo-random subset generation may include in response to a determination that a hash value corresponding to the current value is restricted by the weak bitmask, omitting the current row from the candidate data. Distributed pseudo-random subset generation may include, in response to a determination that the hash value is unrestricted by the weak bitmask, in response to a determination that the hash value is unrestricted by the strong bitmask, incrementing the current counter. Distributed pseudo-random subset generation may include, in response to a determination that the current counter is at least the limit value, resetting the current counter, identifying rows of the candidate data as unevaluated rows, and, in response to identifying, as the weak bitmask, the strong bitmask, obtaining, as the strong bitmask, a more-restricted bitmask that is minimally more restrictive than the weak bitmask. Distributed pseudo-random subset generation may include pseudo-random filtering the candidate data using the weak bitmask, the strong bitmask, the current counter, and the candidate data. Distributed pseudo-random subset generation may include, in response to pseudo-random filtering the first table, obtaining the candidate data as left intermediate data and the weak bitmask as a left bitmask. Distributed pseudo-random subset generation may include, in response to pseudo-random filtering the second table, obtaining the candidate data as right intermediate data and the weak bitmask as a right bitmask. Distributed pseudo-random subset generation may include identifying, as a most-restrictive bitmask, a result of a bitwise logical OR of the left bitmask and the right bitmask. Distributed pseudo-random subset generation may include obtaining intermediate results data by full outer joining the left intermediate data and the right intermediate data on the first column and the second column. Distributed pseudo-random subset generation may include obtaining results data by filtering the intermediate results data using the most-restrictive bitmask. Distributed pseudo-random subset generation may include outputting the results data as responsive to the portion of the data-query, wherein outputting the results data includes limiting the cardinality of rows of the results data to be at most the limit value.

Another aspect of the disclosure is a method for distributed pseudo-random subset generation. Distributed pseudo-random subset generation may include, in response to receiving data expressing a usage intent with respect to a low-latency data analysis system, wherein the low-latency data analysis system includes a distributed in-memory database, obtaining, by the distributed in-memory database, a portion of a data-query responsive to the data expressing the usage intent, wherein the portion of the data-query indicates, a first table, the first table having a first column, and a limit value. Distributed pseudo-random subset generation may include obtaining, by the distributed in-memory database, results data. Obtaining the results data may include obtaining a filtering criteria and pseudo-random filtering the first table using the filtering criteria, a first counter as a current counter, and data from the first table as candidate data, which includes using the first column as a target column. Pseudo-random filtering may include, in response to a determination that the candidate data includes an unevaluated row, identifying the unevaluated row as a current row, wherein the current row includes a current value for the target column, wherein the current value is unique within the target column. Pseudo-random filtering may include, in response to a determination that the candidate data includes an unevaluated row, identifying the current row as an evaluated row, obtaining a current hash value as a result of performing a defined hashing function on the current value, and in response to a determination that the current hash value is restricted by the filtering criteria, omitting the current row from the candidate data. Pseudo-random filtering may include, in response to a determination that the candidate data includes an unevaluated row, in response to a determination that the current hash value is unrestricted by the filtering criteria, incrementing the current counter. Pseudo-random filtering may include, in response to a determination that the current counter is at least the limit value, resetting the current counter, identifying rows of the candidate data as unevaluated rows, and obtaining, as the filtering criteria, minimally more restrictive filtering criteria. Pseudo-random filtering may include pseudo-random filtering the candidate data using the filtering criteria, the current counter, and the candidate data. Obtaining the results data may include in response to pseudo-random filtering the first table, obtaining the candidate data as intermediate results data, and obtaining, as the results data, rows from the intermediate results data such that a cardinality of rows of the results data is at most the limit value. Distributed pseudo-random subset generation may include outputting the results data as responsive to the portion of the data-query.

Another aspect of the disclosure is a method for distributed pseudo-random subset generation. Distributed pseudo-random subset generation may include, in response to receiving data expressing a usage intent with respect to a low-latency data analysis system, wherein the low-latency data analysis system includes a distributed in-memory database, obtaining, by the distributed in-memory database, a portion of a data-query responsive to the data expressing the usage intent, wherein the portion of the data-query indicates, a first table including a first column, a grouping clause with respect to the first column, a second table including a second column, a join clause indicating a full outer join of the first table and the second table on the first column and the second column, and a limit value. Distributed pseudo-random subset generation may include obtaining the first table by grouping rows from a first source table from the distributed in-memory database, such that a row from the first table having a first value for the first column represents a group of rows from the first source table that have the first value for a corresponding column, obtaining the second table from the distributed in-memory database, such that a respective row from the second table has a respective value for the second column that is unique within the second column, obtaining an unrestricted bitmask, obtaining a restricted bitmask that is minimally more restrictive than the unrestricted bitmask, and pseudo-random filtering the first table using the unrestricted bitmask as a weak bitmask, the restricted bitmask as a strong bitmask, a first counter as a current counter, and data from the first table as candidate data, which includes using the first column as a target column. Distributed pseudo-random subset generation may include, in response to pseudo-random filtering the first table, obtaining the candidate data as left intermediate data and the weak bitmask as a left bitmask. Distributed pseudo-random subset generation may include pseudo-random filtering using the second table using unrestricted bitmask as the weak bitmask, the restricted bitmask as the strong bitmask, a second counter as the current counter, and data from the second table as the candidate data, which includes using the second column as the target column. Distributed pseudo-random subset generation may include, in response to pseudo-random filtering the second table, obtaining the candidate data as right intermediate data and the weak bitmask as a right bitmask. Distributed pseudo-random subset generation may include identifying a most-restrictive bitmask among the left bitmask and the right bitmask, obtaining intermediate results data by full outer joining the left intermediate data and the right intermediate data on the first column and the second column, obtaining results data by filtering the intermediate results data using the most-restrictive bitmask, and outputting the results data as responsive to the portion of the data-query, wherein outputting the results data includes limiting the cardinality of rows of the results data to be at most the limit value.

Another aspect of the disclosure is a non-transitory computer-readable storage medium that includes instructions that, when executed by a processor, facilitate performance of operations for distributed pseudo-random subset generation. Distributed pseudo-random subset generation may include receiving data expressing a usage intent with respect to a low-latency data analysis system, wherein the low-latency data analysis system includes a distributed in-memory database. Distributed pseudo-random subset generation may include, in response to receiving the data expressing the usage intent, obtaining, by the distributed in-memory database, a portion of a data-query responsive to the data expressing the usage intent, wherein the portion of the data-query indicates a first table from the distributed in-memory database, the first table having a first column, a second table from the distributed in-memory database, the second table having a second column, a join clause indicating a full outer join of the first table and the second table on the first column and the second column, and a limit value. Distributed pseudo-random subset generation may include obtaining an unrestricted bitmask and obtaining a restricted bitmask that is minimally more restrictive than the unrestricted bitmask. Distributed pseudo-random subset generation may include pseudo-random filtering the first table using the unrestricted bitmask as a weak bitmask, the restricted bitmask as a strong bitmask, a first counter as a current counter, and data from the first table as candidate data, which includes using the first column as a target column. Distributed pseudo-random subset generation may include pseudo-random filtering the second table using unrestricted bitmask as the weak bitmask, the restricted bitmask as the strong bitmask, a second counter as the current counter, and data from the second table as the candidate data, which includes using the second column as the target column. Pseudo-random filtering may include, in response to a determination that the candidate data includes an unevaluated row, identifying the unevaluated row as a current row, wherein the current row includes a current value for the target column, wherein the current value is unique within the target column. Distributed pseudo-random subset generation may include identifying the current row as an evaluated row. Distributed pseudo-random subset generation may include in response to a determination that a hash value corresponding to the current value is restricted by the weak bitmask, omitting the current row from the candidate data. Distributed pseudo-random subset generation may include, in response to a determination that the hash value is unrestricted by the weak bitmask, in response to a determination that the hash value is unrestricted by the strong bitmask, incrementing the current counter. Distributed pseudo-random subset generation may include, in response to a determination that the current counter is at least the limit value, resetting the current counter, identifying rows of the candidate data as unevaluated rows, and, in response to identifying, as the weak bitmask, the strong bitmask, obtaining, as the strong bitmask, a more-restricted bitmask that is minimally more restrictive than the weak bitmask. Distributed pseudo-random subset generation may include pseudo-random filtering the candidate data using the weak bitmask, the strong bitmask, the current counter, and the candidate data. Distributed pseudo-random subset generation may include, in response to pseudo-random filtering the first table, obtaining the candidate data as left intermediate data and the weak bitmask as a left bitmask. Distributed pseudo-random subset generation may include, in response to pseudo-random filtering the second table, obtaining the candidate data as right intermediate data and the weak bitmask as a right bitmask. Distributed pseudo-random subset generation may include identifying, as a most-restrictive bitmask, a result of a bitwise logical OR of the left bitmask and the right bitmask. Distributed pseudo-random subset generation may include obtaining intermediate results data by full outer joining the left intermediate data and the right intermediate data on the first column and the second column. Distributed pseudo-random subset generation may include obtaining results data by filtering the intermediate results data using the most-restrictive bitmask. Distributed pseudo-random subset generation may include outputting the results data as responsive to the portion of the data-query, wherein outputting the results data includes limiting the cardinality of rows of the results data to be at most the limit value.

Another aspect of the disclosure is a non-transitory computer-readable storage medium that includes instructions that, when executed by a processor, facilitate performance of operations for distributed pseudo-random subset generation. Distributed pseudo-random subset generation may include, in response to receiving data expressing a usage intent with respect to a low-latency data analysis system, wherein the low-latency data analysis system includes a distributed in-memory database, obtaining, by the distributed in-memory database, a portion of a data-query responsive to the data expressing the usage intent, wherein the portion of the data-query indicates, a first table, the first table having a first column, and a limit value. Distributed pseudo-random subset generation may include obtaining, by the distributed in-memory database, results data. Obtaining the results data may include obtaining a filtering criteria and pseudo-random filtering the first table using the filtering criteria, a first counter as a current counter, and data from the first table as candidate data, which includes using the first column as a target column. Pseudo-random filtering may include, in response to a determination that the candidate data includes an unevaluated row, identifying the unevaluated row as a current row, wherein the current row includes a current value for the target column, wherein the current value is unique within the target column. Pseudo-random filtering may include, in response to a determination that the candidate data includes an unevaluated row, identifying the current row as an evaluated row, obtaining a current hash value as a result of performing a defined hashing function on the current value, and in response to a determination that the current hash value is restricted by the filtering criteria, omitting the current row from the candidate data. Pseudo-random filtering may include, in response to a determination that the candidate data includes an unevaluated row, in response to a determination that the current hash value is unrestricted by the filtering criteria, incrementing the current counter. Pseudo-random filtering may include, in response to a determination that the current counter is at least the limit value, resetting the current counter, identifying rows of the candidate data as unevaluated rows, and obtaining, as the filtering criteria, minimally more restrictive filtering criteria. Pseudo-random filtering may include pseudo-random filtering the candidate data using the filtering criteria, the current counter, and the candidate data. Obtaining the results data may include in response to pseudo-random filtering the first table, obtaining the candidate data as intermediate results data, and obtaining, as the results data, rows from the intermediate results data such that a cardinality of rows of the results data is at most the limit value. Distributed pseudo-random subset generation may include outputting the results data as responsive to the portion of the data-query.

Another aspect of the disclosure is a non-transitory computer-readable storage medium that includes instructions that, when executed by a processor, facilitate performance of operations for distributed pseudo-random subset generation. Distributed pseudo-random subset generation may include, in response to receiving data expressing a usage intent with respect to a low-latency data analysis system, wherein the low-latency data analysis system includes a distributed in-memory database, obtaining, by the distributed in-memory database, a portion of a data-query responsive to the data expressing the usage intent, wherein the portion of the data-query indicates, a first table including a first column, a grouping clause with respect to the first column, a second table including a second column, a join clause indicating a full outer join of the first table and the second table on the first column and the second column, and a limit value. Distributed pseudo-random subset generation may include obtaining the first table by grouping rows from a first source table from the distributed in-memory database, such that a row from the first table having a first value for the first column represents a group of rows from the first source table that have the first value for a corresponding column, obtaining the second table from the distributed in-memory database, such that a respective row from the second table has a respective value for the second column that is unique within the second column, obtaining an unrestricted bitmask, obtaining a restricted bitmask that is minimally more restrictive than the unrestricted bitmask, and pseudo-random filtering the first table using the unrestricted bitmask as a weak bitmask, the restricted bitmask as a strong bitmask, a first counter as a current counter, and data from the first table as candidate data, which includes using the first column as a target column. Distributed pseudo-random subset generation may include, in response to pseudo-random filtering the first table, obtaining the candidate data as left intermediate data and the weak bitmask as a left bitmask. Distributed pseudo-random subset generation may include pseudo-random filtering using the second table using unrestricted bitmask as the weak bitmask, the restricted bitmask as the strong bitmask, a second counter as the current counter, and data from the second table as the candidate data, which includes using the second column as the target column. Distributed pseudo-random subset generation may include, in response to pseudo-random filtering the second table, obtaining the candidate data as right intermediate data and the weak bitmask as a right bitmask. Distributed pseudo-random subset generation may include identifying a most-restrictive bitmask among the left bitmask and the right bitmask, obtaining intermediate results data by full outer joining the left intermediate data and the right intermediate data on the first column and the second column, obtaining results data by filtering the intermediate results data using the most-restrictive bitmask, and outputting the results data as responsive to the portion of the data-query, wherein outputting the results data includes limiting the cardinality of rows of the results data to be at most the limit value.

Another aspect of the disclosure is a system for distributed pseudo-random subset generation including a processor, and a memory, where the memory stores instructions executable by the processor to receive data expressing a usage intent with respect to a low-latency data analysis system, wherein the low-latency data analysis system includes a distributed in-memory database. Where the memory stores instructions executable by the processor to, in response to receiving the data expressing the usage intent, obtain, by the distributed in-memory database, a portion of a data-query responsive to the data expressing the usage intent, wherein the portion of the data-query indicates a first table from the distributed in-memory database, the first table having a first column, a second table from the distributed in-memory database, the second table having a second column, a join clause indicating a full outer join of the first table and the second table on the first column and the second column, and a limit value. Where the memory stores instructions executable by the processor to obtain an unrestricted bitmask and obtaining a restricted bitmask that is minimally more restrictive than the unrestricted bitmask. Where the memory stores instructions executable by the processor to pseudo-random filter the first table using the unrestricted bitmask as a weak bitmask, the restricted bitmask as a strong bitmask, a first counter as a current counter, and data from the first table as candidate data, which includes using the first column as a target column. Where the memory stores instructions executable by the processor to pseudo-random filter the second table using unrestricted bitmask as the weak bitmask, the restricted bitmask as the strong bitmask, a second counter as the current counter, and data from the second table as the candidate data, which includes using the second column as the target column. To pseudo-random filter, the memory stores instructions executable by the processor to, in response to a determination that the candidate data includes an unevaluated row, identify the unevaluated row as a current row, wherein the current row includes a current value for the target column, wherein the current value is unique within the target column. To pseudo-random filter, the memory stores instructions executable by the processor to identify the current row as an evaluated row. To pseudo-random filter, the memory stores instructions executable by the processor to, in response to a determination that a hash value corresponding to the current value is restricted by the weak bitmask, omit the current row from the candidate data. To pseudo-random filter, the memory stores instructions executable by the processor to, in response to a determination that the hash value is unrestricted by the weak bitmask, in response to a determination that the hash value is unrestricted by the strong bitmask, increment the current counter. Where the memory stores instructions executable by the processor to, in response to a determination that the current counter is at least the limit value, reset the current counter, identify rows of the candidate data as unevaluated rows, and, in response to identifying, as the weak bitmask, the strong bitmask, obtain, as the strong bitmask, a more-restricted bitmask that is minimally more restrictive than the weak bitmask. Where the memory stores instructions executable by the processor to pseudo-random filter the candidate data using the weak bitmask, the strong bitmask, the current counter, and the candidate data. Where the memory stores instructions executable by the processor to, in response to pseudo-random filtering the first table, obtain the candidate data as left intermediate data and the weak bitmask as a left bitmask. Where the memory stores instructions executable by the processor to, in response to pseudo-random filtering the second table, obtain the candidate data as right intermediate data and the weak bitmask as a right bitmask. Where the memory stores instructions executable by the processor to identify, as a most-restrictive bitmask, a result of a bitwise logical OR of the left bitmask and the right bitmask. Where the memory stores instructions executable by the processor to obtain intermediate results data by full outer joining the left intermediate data and the right intermediate data on the first column and the second column. Where the memory stores instructions executable by the processor to obtain results data by filtering the intermediate results data using the most-restrictive bitmask. Where the memory stores instructions executable by the processor to output the results data as responsive to the portion of the data-query, wherein outputting the results data includes limiting the cardinality of rows of the results data to be at most the limit value.

Another aspect of the disclosure is a system for distributed pseudo-random subset generation including a processor, and a memory, where the memory stores instructions executable by the processor to perform distributed pseudo-random subset generation. To perform distributed pseudo-random subset generation the memory stores instructions executable by the processor to, in response to receiving data expressing a usage intent with respect to a low-latency data analysis system, wherein the low-latency data analysis system includes a distributed in-memory database, obtain, by the distributed in-memory database, a portion of a data-query responsive to the data expressing the usage intent, wherein the portion of the data-query indicates, a first table, the first table having a first column, and a limit value. The memory stores instructions executable by the processor to obtain, by the distributed in-memory database, results data. To obtain the results data the memory stores instructions executable by the processor to obtain a filtering criteria and pseudo-random filter the first table using the filtering criteria, a first counter as a current counter, and data from the first table as candidate data, which includes using the first column as a target column. To pseudo-random filter the memory stores instructions executable by the processor to, in response to a determination that the candidate data includes an unevaluated row, identify the unevaluated row as a current row, wherein the current row includes a current value for the target column, wherein the current value is unique within the target column. To pseudo-random filter the memory stores instructions executable by the processor to, in response to a determination that the candidate data includes an unevaluated row, identify the current row as an evaluated row, obtain a current hash value as a result of performing a defined hashing function on the current value, and, in response to a determination that the current hash value is restricted by the filtering criteria, omit the current row from the candidate data. To pseudo-random filter the memory stores instructions executable by the processor to, in response to a determination that the candidate data includes an unevaluated row, in response to a determination that the current hash value is unrestricted by the filtering criteria, increment the current counter. To pseudo-random filter the memory stores instructions executable by the processor to, in response to a determination that the current counter is at least the limit value, reset the current counter, identify rows of the candidate data as unevaluated rows, and obtain, as the filtering criteria, minimally more restrictive filtering criteria. To pseudo-random filter the memory stores instructions executable by the processor to pseudo-random filter the candidate data using the filtering criteria, the current counter, and the candidate data. To obtain the results data the memory stores instructions executable by the processor to obtain the results data may include in response to pseudo-random filtering the first table, obtain the candidate data as intermediate results data, and obtain, as the results data, rows from the intermediate results data such that a cardinality of rows of the results data is at most the limit value. The memory stores instructions executable by the processor to output the results data as responsive to the portion of the data-query.

Another aspect of the disclosure is a system for distributed pseudo-random subset generation including a processor, and a memory, where the memory stores instructions executable by the processor to perform distributed pseudo-random subset generation. To perform distributed pseudo-random subset generation the memory stores instructions executable by the processor to, in response to receiving data expressing a usage intent with respect to a low-latency data analysis system, wherein the low-latency data analysis system includes a distributed in-memory database, obtain, by the distributed in-memory database, a portion of a data-query responsive to the data expressing the usage intent, wherein the portion of the data-query indicates a first table including a first column, a grouping clause with respect to the first column, a second table including a second column, a join clause indicating a full outer join of the first table and the second table on the first column and the second column, and a limit value. To perform distributed pseudo-random subset generation the memory stores instructions executable by the processor to obtain the first table by grouping rows from a first source table from the distributed in-memory database, such that a row from the first table having a first value for the first column represents a group of rows from the first source table that have the first value for a corresponding column. To perform distributed pseudo-random subset generation the memory stores instructions executable by the processor to obtain the second table from the distributed in-memory database, such that a respective row from the second table has a respective value for the second column that is unique within the second column. To perform distributed pseudo-random subset generation the memory stores instructions executable by the processor to obtain an unrestricted bitmask, obtain a restricted bitmask that is minimally more restrictive than the unrestricted bitmask, and pseudo-random filter the first table using the unrestricted bitmask as a weak bitmask, the restricted bitmask as a strong bitmask, a first counter as a current counter, and data from the first table as candidate data, which includes using the first column as a target column. To perform distributed pseudo-random subset generation the memory stores instructions executable by the processor to, in response to pseudo-random filtering the first table, obtain the candidate data as left intermediate data and the weak bitmask as a left bitmask. To perform distributed pseudo-random subset generation the memory stores instructions executable by the processor to pseudo-random filter using the second table using unrestricted bitmask as the weak bitmask, the restricted bitmask as the strong bitmask, a second counter as the current counter, and data from the second table as the candidate data, which includes using the second column as the target column. To perform distributed pseudo-random subset generation the memory stores instructions executable by the processor to, in response to pseudo-random filtering the second table, obtain the candidate data as right intermediate data and the weak bitmask as a right bitmask. To perform distributed pseudo-random subset generation the memory stores instructions executable by the processor to identify a most-restrictive bitmask among the left bitmask and the right bitmask, obtain intermediate results data by full outer joining the left intermediate data and the right intermediate data on the first column and the second column, obtain results data by filtering the intermediate results data using the most-restrictive bitmask, and output the results data as responsive to the portion of the data-query, wherein outputting the results data includes limiting the cardinality of rows of the results data to be at most the limit value.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
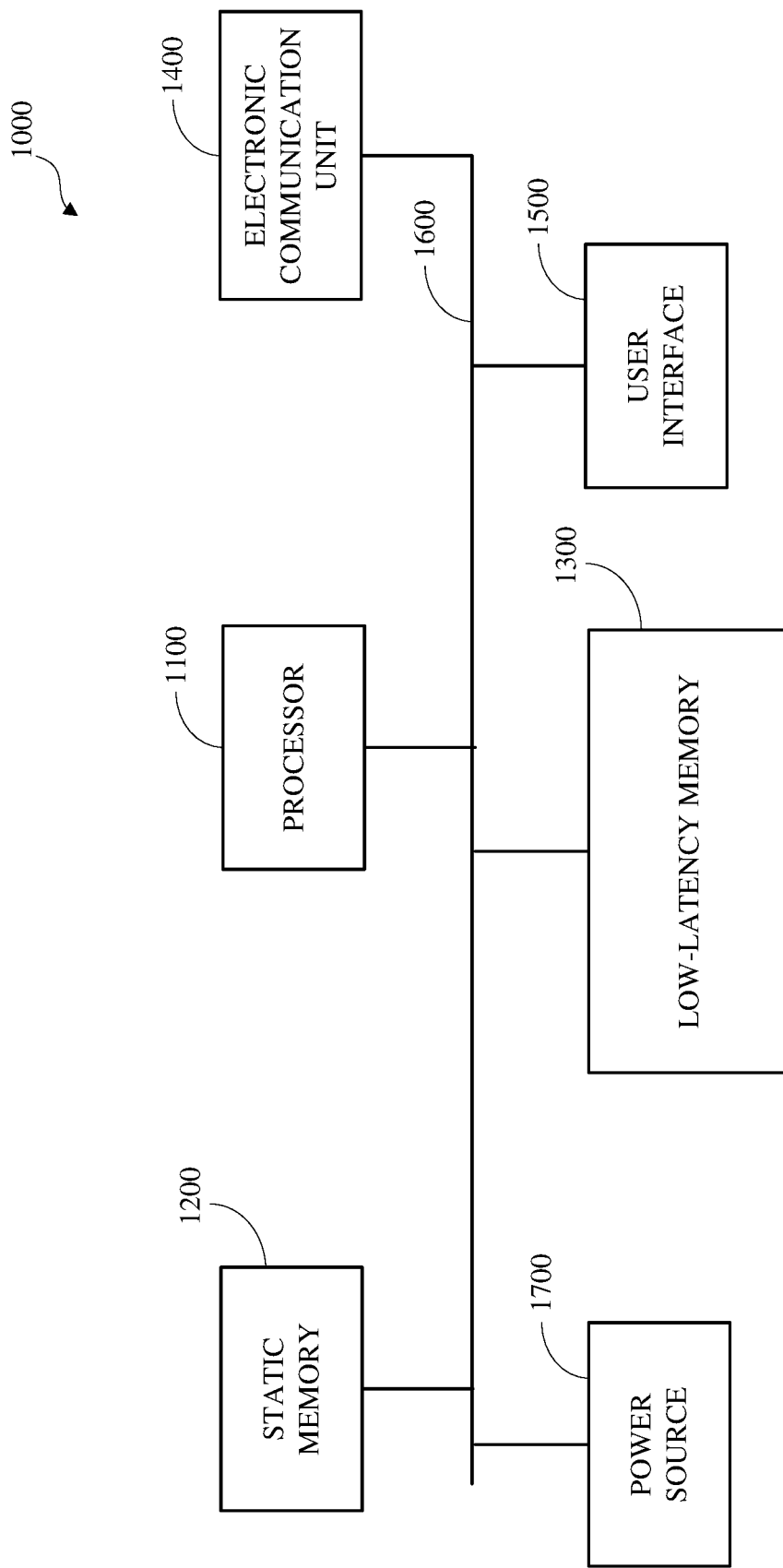
FIG. 1 is a block diagram of an example of a computing device.

Businesses and other organizations store data, such as business records, transaction records, and the like, in data storage systems, such as relational database systems that store data as records, or rows, having values, or fields, corresponding to respective columns in tables that can be interrelated using key values. Useful data, such as data aggregations, patterns, and statistical anomalies, which may not be apparent to human users, may be unavailable in smaller datasets, such as datasets including thousands, such as ten-thousand, rows of data. Relatively large databases, such as databases including millions, or billions, of rows are complex and utilize substantial resources. The amount of data stored and accessed in a database or data analysis system may be correlated, such as proportional, to the resource utilization, such as memory utilization, processing utilization, communications bandwidth utilization, and power utilization of the database and data analysis systems, along with the corresponding complexity and costs thereof, such as emissions that may be associated with the generation of energy corresponding to the power utilization. In some systems, high resource utilization may correspond with performance and reliability degradation as the available resources are exhausted. Furthermore, the utility of data, such as data stored in a database, may be limited without substantial correlation, interpretation, and analysis. The complexity of databases and data analysis system and the large volumes of data stored, accessed, and generated therein limit the accessibility and utility of the data and require substantial skilled human resources to code procedures and tools that allow business users to access useful data. The low-latency data analysis system including a distributed low-latency database described herein improves on the performance, resource utilization, reliability, accuracy, and data utility of database and data analysis systems.

Databases and data analysis systems may obtain data, such as results data responsive to a request for data, which may include accessing, transporting, and storing a large amount of data, such as thousands, millions, or more, rows of data, which may correspond with high resource utilization and may cause some operations to fail due to resource exhaustion. Beyond a relatively small amount of results data, such as hundreds of rows, the results data may have diminishing utility. The cumulative utility of the results data may be limited to the utility of a small portion thereof and may be further reduced by large amounts of further results data.

To improve performance, resource utilization, reliability, accuracy, and data utility, in the distributed low-latency database described herein, a table may be partitioned into regions. Respective regions of the table may include data that is non-overlapping with data included in other regions for the respective table. The regions are distributed among instances of the distributed low-latency database. Respective instances of the distributed low-latency database, which may be coordinated, may utilize independent resources, and may operate concurrently, such as in parallel.

The low-latency data analysis system including the distributed low-latency database described herein may obtain data expressing a usage intent with respect to the low-latency data analysis system, which may indicate a request for data. The low-latency data analysis system may resolve and transform, or otherwise process, the data expressing the usage intent to obtain a data-query, which may be a representation of the data expressing the usage intent, or a portion thereof, expressed in accordance with a defined structured query language, such as the defined structured query language of the distributed low-latency database described herein.

Some data-queries may include a join clause indicating that execution of the data-query data includes accessing and combining data from two or more tables in accordance with the join clause. For example, executing a data-query including a join clause may include combining data, such as rows, from a first, or left, table with data from a second, or right, table. The join clause may indicate a column from the left table as a left join key column and a column from the right table as a right join key column such that execution of the data-query includes combining the data from the left table with the data from the right table by matching values from the left join key column with values from the right join key column. A full outer join, or equi-join, clause may indicate that rows from the left table and rows from the right table, for which values from the left join key column are unmatched with values from the right join key column, are included in the results data. In a distributed database, the data from the left table may be sharded among regions distributed to respective instances of the distributed database and the data from the right table may be sharded among regions distributed to respective instances of the distributed database.

Some data-queries may include a grouping clause, such as a 'group by' clause, indicating that execution of the data-query includes accessing and combining data from two or more rows from a table having a value for a column indicated in the grouping clause. Respective rows of data obtained in accordance with a grouping clause may have unique values for the column indicated by the grouping clause with respect to the data obtained. Data-queries that include a join clause and a grouping clause may be chasm trap queries.

To improve performance, resource utilization, reliability, accuracy, and data utility, in the distributed low-latency database described herein, the low-latency data analysis system, or the distributed low-latency database, may include a 'limit' clause in a data-query that indicates a limit value or threshold expressing a maximum cardinality, or number, of rows that may be included the results data that may be output responsive to the request for data. The maximum cardinality of rows indicated by the limit clause may be small, such as hundreds or thousands of rows, relative to the amount of data that may be accessed, transported, and stored as intermediate data in accordance with execution of the data-query, which may include millions or billions of rows.

For example, in a distributed database, respective instances of the distributed database may access millions of rows as intermediate data, which may include memory resource utilization at the respective instance of the distributed database for storing the intermediate data. The intermediate data may be transported, which may include utilization network communications resources, from among the respective instances of the distributed database to an instance of the instances of the distributed database designated as a query coordinator for the data-query. The query coordinator may receive and store the intermediate results data obtained from other instances of the distributed database and may obtain further results data from a region of the table stored at the query coordinator instance of the distributed database, which may include relatively high resource utilization at the query coordinator for processing and storing the intermediate data. The query coordinator instance of the distributed database may combine the intermediate data and may output, or otherwise subsequently process, results data including a cardinality of rows limited in accordance with the limit clause and omitting the other intermediate data, such that the results data includes a small number of rows relative to the intermediate data omitted from the results data.

The execution, or processing, of some data-queries, such as complex data-queries, which may include one or more join clauses, one or more grouping clauses, one or more limit clauses, or a combination thereof, may include generating and executing, or otherwise processing, one or more data-queries (sub-queries).

The low-latency data analysis system including the distributed low-latency database described herein may improve performance, resource utilization, reliability, accuracy, and data utility by implementing the systems and methods for distributed pseudo-random subset generation disclosed herein. Distributed pseudo-random subset generation reduces the amount, such as the cardinality, or number, of rows, of data transported and stored by respective instances of the distributed in-memory database, and reduces the amount, such as the cardinality, or number, of rows, of data accessed, transported, and stored by a query-coordinator instance of the distributed in-memory database, in accordance with executing a data-query including a limit clause. Distributed pseudo-random subset generation includes using a bitmask, or hash mask, at respective instances of the distributed in-memory database to reduce the amount, such as the cardinality, or number, of rows, of data accessed by, transported to, and stored, such as by a query-coordinator instance of the distributed in-memory database, in accordance with executing a data-query including a limit clause, which improves at least the performance, resource utilization, and reliability of the low-latency data analysis system.

FIG. 1 is a block diagram of an example of a computing device 1000. One or more aspects of this disclosure may be implemented using the computing device 1000. The computing device 1000 includes a processor 1100, static memory 1200, low-latency memory 1300, an electronic communication unit 1400, a user interface 1500, a bus 1600, and a power source 1700. Although shown as a single unit, any one or more element of the computing device 1000 may be integrated into any number of separate physical units. For example, the low-latency memory 1300 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may include a cache, or cache memory, for internal storage of operating data or instructions. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the static memory 1200, the low-latency memory 1300, the electronic communication unit 1400, the user interface 1500, the bus 1600, the power source 1700, or any combination thereof. The processor may execute, which may include controlling, such as by sending electronic signals to, receiving electronic signals from, or both, the static memory 1200, the low-latency memory 1300, the electronic communication unit 1400, the user interface 1500, the bus 1600, the power source 1700, or any combination thereof to execute, instructions, programs, code, applications, or the like, which may include executing one or more aspects of an operating system, and which may include executing one or more instructions to perform one or more aspects described herein, alone or in combination with one or more other processors.

The static memory 1200 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the static memory 1200 may be implemented as multiple logical or physical units.

The static memory 1200 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 1300 is coupled to the processor 1100 via the bus 1600 and may include any storage medium with low-latency data access including, for example, DRAM modules such as DDR SDRAM, Phase-Change Memory (PCM), flash memory, or a solid-state drive. Although shown as a single block in FIG. 1, the low-latency memory 1300 may be implemented as multiple logical or physical units. Other configurations may be used. For example, low-latency memory 1300, or a portion thereof, and processor 1100 may be combined, such as by using a system on a chip design.

The low-latency memory 1300 may store executable instructions or data, such as application data for low-latency access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The low-latency memory 1300 may be used to store data that is analyzed or processed using the systems or methods described herein. For example, storage of some or all data in low-latency memory 1300 instead of static memory 1200 may improve the execution speed of the systems and methods described herein by permitting access to data more quickly by an order of magnitude or greater (e.g., nanoseconds instead of microseconds).

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE), or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active matrix organic light emitting diode (AMO-LED), or other suitable display. In some implementations, the user interface 1500, or a portion thereof, may be part of another computing device (not shown). For example, a physical user interface, or a portion thereof, may be omitted from the computing device 1000 and a remote or virtual interface may be used, such as via the electronic communication unit 1400.

The bus 1600 is coupled to the static memory 1200, the low-latency memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
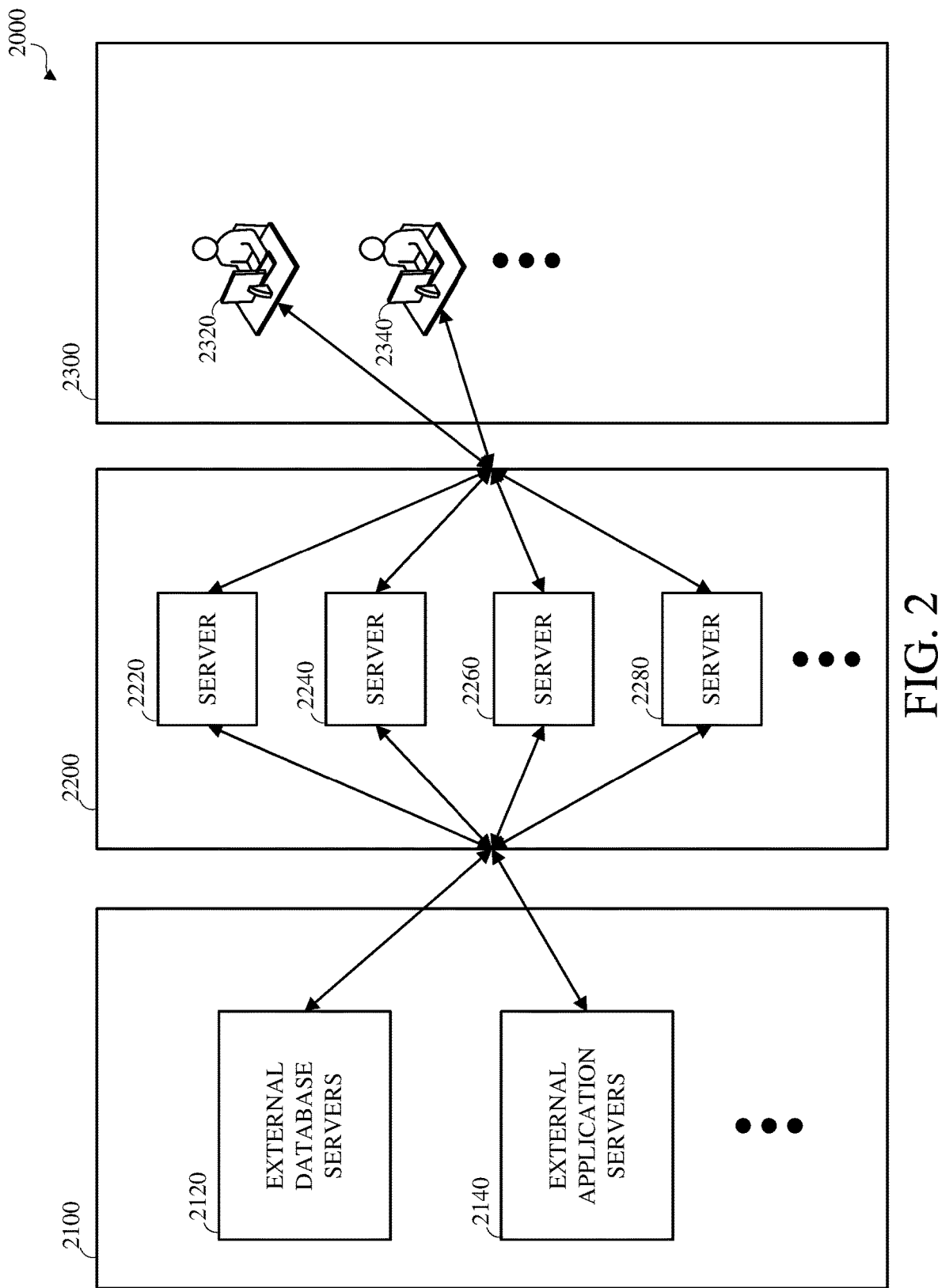
FIG. 2 is a block diagram of an example of a computing system.

FIG. 2 is a block diagram of an example of a computing system 2000. As shown, the computing system 2000 includes an external data source portion 2100, an internal database analysis portion 2200, and a system interface portion 2300. The computing system 2000 may include other elements not shown in FIG. 2, such as computer network elements.

The external data source portion 2100 may be associated with, such as controlled by, an external person, entity, or organization (second-party). The internal database analysis portion 2200 may be associated with, such as created by or controlled by, a person, entity, or organization (first-party). The system interface portion 2300 may be associated with, such as created by or controlled by, the first-party and may be accessed by the first-party, the second-party, third-parties, or a combination thereof, such as in accordance with access and authorization permissions and procedures.

The external data source portion 2100 is shown as including external database servers 2120 and external application servers 2140. The external data source portion 2100 may include other elements not shown in FIG. 2. The external data source portion 2100 may include external computing devices, such as the computing device 1000 shown in FIG. 1, which may be used by or accessible to the external person, entity, or organization (second-party) associated with the external data source portion 2100, including but not limited to external database servers 2120 and external application servers 2140. The external computing devices may include data regarding the operation of the external person, entity, or organization (second-party) associated with the external data source portion 2100.

The external database servers 2120 may be one or more computing devices configured to store data in a format and schema determined externally from the internal database analysis portion 2200, such as by a second-party associated with the external data source portion 2100, or a third party.

For example, the external database server 2120 may use a relational database and may include a database catalog with a schema. In some embodiments, the external database server 2120 may include a non-database data storage structure, such as a text-based data structure, such as a comma separated variable structure or an extensible markup language formatted structure or file. For example, the external database servers 2120 can include data regarding the production of materials by the external person, entity, or organization (second-party) associated with the external data source portion 2100, communications between the external person, entity, or organization (second-party) associated with the external data source portion 2100 and third parties, or a combination thereof. Other data may be included. The external database may be a structured database system, such as a relational database operating in a relational database management system (RDBMS), which may be an enterprise database. In some embodiments, the external database may be an unstructured data source. The external data may include data or content, such as sales data, revenue data, profit data, tax data, shipping data, safety data, sports data, health data, weather data, or the like, or any other data, or combination of data, that may be generated by or associated with a user, an organization, or an enterprise and stored in a database system. For simplicity and clarity, data stored in or received from the external data source portion 2100 may be referred to herein as enterprise data.

The external application server 2140 may include application software, such as application software used by the external person, entity, or organization (second-party) associated with the external data source portion 2100. The external application server 2140 may include data or metadata relating to the application software.

The external database servers 2120, the external application servers 2140, or both, shown in FIG. 2 may represent logical units or devices that may be implemented on one or more physical units or devices, which may be controlled or operated by the first party, the second party, or a third party.

The external data source portion 2100, or aspects thereof, such as the external database servers 2120, the external application servers 2140, or both, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

The internal database analysis portion 2200 is shown as including servers 2220, 2240, 2260, and 2280. The servers 2220, 2240, 2260, and 2280 may be computing devices, such as the computing device 1000 shown in FIG. 1. Although four servers 2220, 2240, 2260, and 2280 are shown in FIG. 2, other numbers, or cardinalities, of servers may be used. For example, the number of computing devices may be determined based on the capability of individual computing devices, the amount of data to be processed, the complexity of the data to be processed, or a combination thereof. Other metrics may be used for determining the number of computing devices.

The internal database analysis portion 2200 may store data, process data, or store and process data. The internal database analysis portion 2200 may include a distributed cluster (not expressly shown) which may include two or more of the servers 2220, 2240, 2260, and 2280. The operation of distributed cluster, such as the operation of the servers 2220, 2240, 2260, and 2280 individually, in combination, or both, may be managed by a distributed cluster manager. For example, the server 2220 may be the distributed cluster manager. In another example, the distributed cluster manager may be implemented on another computing device (not shown). The data and processing of the distributed cluster may be distributed among the servers 2220, 2240, 2260, and 2280, such as by the distributed cluster manager.

Enterprise data from the external data source portion 2100, such as from the external database server 2120, the external application server 2140, or both may be imported into the internal database analysis portion 2200. The external database server 2120, the external application server 2140, or both may be one or more computing devices and may communicate with the internal database analysis portion 2200 via electronic communication. The imported data may be distributed among, processed by, stored on, or a combination thereof, one or more of the servers 2220, 2240, 2260, and 2280. Importing the enterprise data may include importing or accessing the data structures of the enterprise data. Importing the enterprise data may include generating internal data, internal data structures, or both, based on the enterprise data. The internal data, internal data structures, or both may accurately represent and may differ from the enterprise data, the data structures of the enterprise data, or both. In some implementations, enterprise data from multiple external data sources may be imported into the internal database analysis portion 2200. For simplicity and clarity, data stored or used in the internal database analysis portion 2200 may be referred to herein as internal data. For example, the internal data, or a portion thereof, may represent, and may be distinct from, enterprise data imported into or accessed by the internal database analysis portion 2200.

The system interface portion 2300 may include one or more client devices 2320, 2340. The client devices 2320, 2340 may be computing devices, such as the computing device 1000 shown in FIG. 1. For example, one of the client devices 2320, 2340 may be a desktop or laptop computer and the other of the client devices 2320, 2340 may be a mobile device, smartphone, or tablet. One or more of the client devices 2320, 2340 may access the internal database analysis portion 2200. For example, the internal database analysis portion 2200 may provide one or more services, application interfaces, or other electronic computer communication interfaces, such as a web site, and the client devices 2320, 2340 may access the interfaces provided by the internal database analysis portion 2200, which may include accessing the internal data stored in the internal database analysis portion 2200.

In an example, one or more of the client devices 2320, 2340 may send a message or signal indicating a request for data, which may include a request for data analysis, to the internal database analysis portion 2200. The internal database analysis portion 2200 may receive and process the request, which may include distributing the processing among one or more of the servers 2220, 2240, 2260, and 2280, may generate a response to the request, which may include generating or modifying internal data, internal data structures, or both, and may output the response to the client device 2320, 2340 that sent the request. Processing the request may include accessing one or more internal data indexes, an internal database, or a combination thereof. The client device 2320, 2340 may receive the response, including the response data or a portion thereof, and may store, output, or both, the response or a representation thereof, such as a representation of the response data, or a portion thereof, which may include presenting the representation via a user interface on a presentation device of the client device 2320, 2340, such as to a user of the client device 2320, 2340.

The system interface portion 2300, or aspects thereof, such as one or more of the client devices 2320, 2340, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

Figure 3:
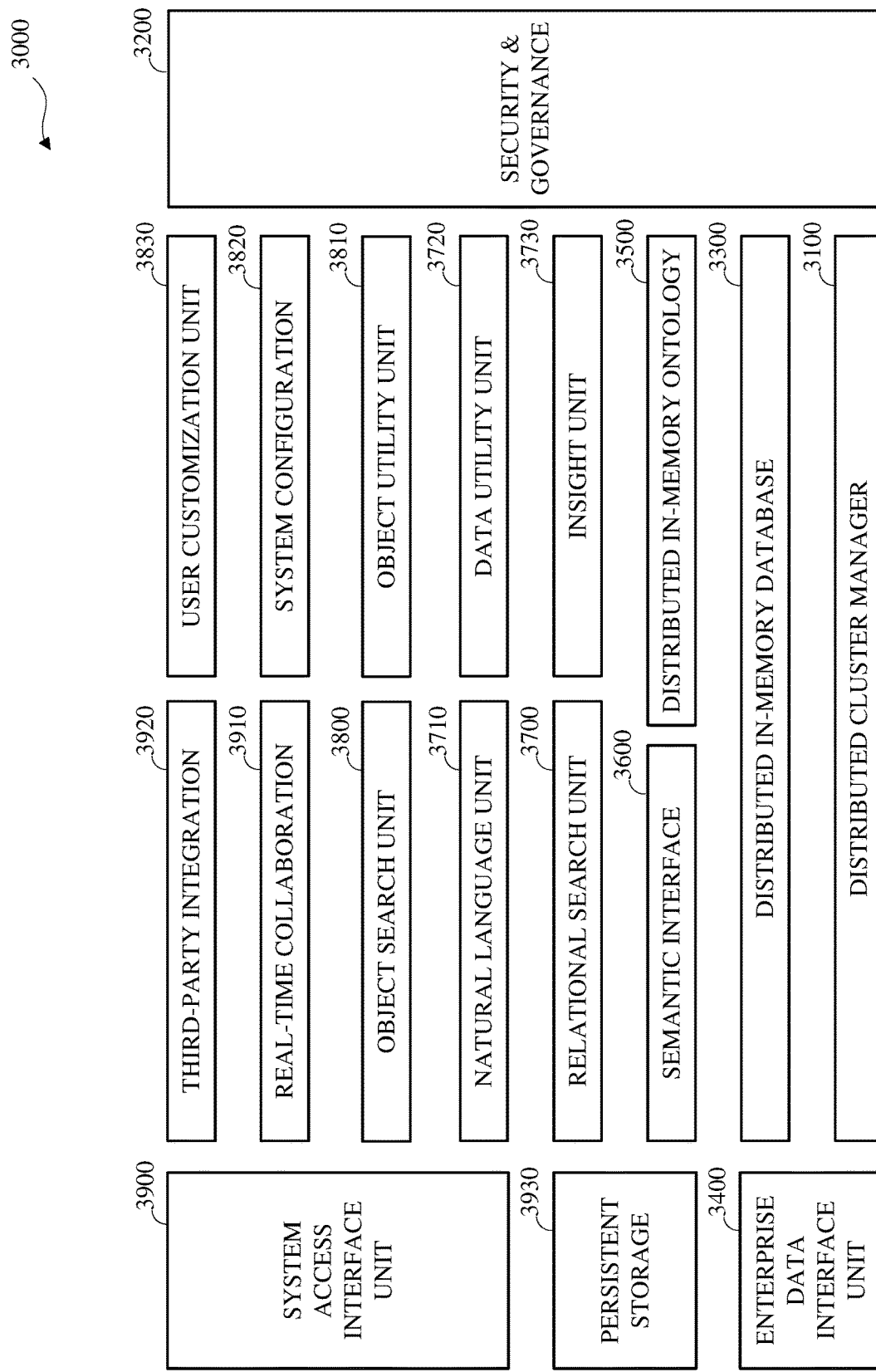
FIG. 3 is a block diagram of an example of a low-latency data analysis system.

FIG. 3 is a block diagram of an example of a low-latency data analysis system 3000. The low-latency data, or database, analysis system 3000, or aspects thereof, may be similar to the internal database analysis portion 2200 shown in FIG. 2, except as described herein or otherwise clear from context. The low-latency data analysis system 3000, or aspects thereof, may be implemented on one or more computing devices, such as servers 2220, 2240, 2260, and 2280 shown in FIG. 2, which may be in a clustered or distributed computing configuration.

The low-latency data analysis system 3000 may store and maintain the internal data, or a portion thereof, such as low-latency data, in a low-latency memory device, such as the low-latency memory 1300 shown in FIG. 1, or any other type of data storage medium or combination of data storage devices with relatively fast (low-latency) data access, organized in a low-latency data structure. In some embodiments, the low-latency data analysis system 3000 may be implemented as one or more logical devices in a cloud-based configuration optimized for automatic database analysis.

As shown, the low-latency data analysis system 3000 includes a distributed cluster manager 3100, a security and governance unit 3200, a distributed in-memory database 3300, an enterprise data interface unit 3400, a distributed in-memory ontology unit 3500, a semantic interface unit 3600, a relational search unit 3700, a natural language processing unit 3710, a data utility unit 3720, an insight unit 3730, an object search unit 3800, an object utility unit 3810, a system configuration unit 3820, a user customization unit 3830, a system access interface unit 3900, a real-time collaboration unit 3910, a third-party integration unit 3920, and a persistent storage unit 3930, which may be collectively referred to as the components of the low-latency data analysis system 3000.

Although not expressly shown in FIG. 3, one or more of the components of the low-latency data analysis system 3000 may be implemented on one or more operatively connected physical or logical computing devices, such as in a distributed cluster computing configuration, such as the internal database analysis portion 2200 shown in FIG. 2. Although shown separately in FIG. 3, one or more of the components of the low-latency data analysis system 3000, or respective aspects thereof, may be combined or otherwise organized.

The low-latency data analysis system 3000 may include different, fewer, or additional components not shown in FIG. 3. The aspects or components implemented in an instance of the low-latency data analysis system 3000 may be configurable. For example, the insight unit 3730 may be omitted or disabled. One or more of the components of the low-latency data analysis system 3000 may be implemented in a manner such that aspects thereof are divided or combined into various executable modules or libraries in a manner which may differ from that described herein.

The low-latency data analysis system 3000 may implement an application programming interface (API), which may monitor, receive, or both, input signals or messages from external devices and systems, client systems, process received signals or messages, transmit corresponding signals or messages to one or more of the components of the low-latency data analysis system 3000, and output, such as transmit or send, output messages or signals to respective external devices or systems. The low-latency data analysis system 3000 may be implemented in a distributed computing configuration.

The distributed cluster manager 3100 manages the operative configuration of the low-latency data analysis system 3000. Managing the operative configuration of the low-latency data analysis system 3000 may include controlling the implementation of and distribution of processing and storage across one or more logical devices operating on one or more physical devices, such as the servers 2220, 2240, 2260, and 2280 shown in FIG. 2. The distributed cluster manager 3100 may generate and maintain configuration data for the low-latency data analysis system 3000, such as in one or more tables, identifying the operative configuration of the low-latency data analysis system 3000. For example, the distributed cluster manager 3100 may automatically update the low-latency data analysis system configuration data in response to an operative configuration event, such as a change in availability or performance for a physical or logical unit of the low-latency data analysis system 3000. One or more of the component units of low-latency data analysis system 3000 may access the database analysis system configuration data, such as to identify intercommunication parameters or paths.

The security and governance unit 3200 may describe, implement, enforce, or a combination thereof, rules and procedures for controlling access to aspects of the low-latency data analysis system 3000, such as the internal data of the low-latency data analysis system 3000 and the features and interfaces of the low-latency data analysis system 3000. The security and governance unit 3200 may apply security at an ontological level to control or limit access to the internal data of the low-latency data analysis system 3000, such as to columns, tables, rows, or fields, which may include using row level security.

Although shown as a single unit in FIG. 3, the distributed in-memory database 3300 may be implemented in a distributed configuration, such as distributed among the servers 2220, 2240, 2260, and 2280 shown in FIG. 2, which may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The distributed in-memory database 3300 may generate, maintain, or both, a low-latency data structure and data stored or maintained therein (low-latency data). The low-latency data may include principal data, which may represent enterprise data, such as enterprise data imported from an external enterprise data source, such as the external data source portion 2100 shown in FIG. 2. In some implementations, the distributed in-memory database 3300 may include system internal data representing one or more aspects, features, or configurations of the low-latency data analysis system 3000. The distributed in-memory database 3300 and the low-latency data stored therein, or a portion thereof, may be accessed using commands, messages, or signals in accordance with a defined structured query language associated with the distributed in-memory database 3300.

The low-latency data, or a portion thereof, may be organized as tables in the distributed in-memory database 3300. A table may be a data structure to organize or group the data or a portion thereof, such as related or similar data. A table may have a defined structure. For example, each table may define or describe a respective set of one or more columns.

A column may define or describe the characteristics of a discrete aspect of the data in the table. For example, the definition or description of a column may include an identifier, such as a name, for the column within the table, and one or more constraints, such as a data type, for the data corresponding to the column in the table. The definition or description of a column may include other information, such as a description of the column. The data in a table may be accessible or partitionable on a per-column basis. The set of tables, including the column definitions therein, and information describing relationships between elements, such as tables and columns, of the database may be defined or described by a database schema or design. The cardinality of columns of a table, and the definition and organization of the columns, may be defined by the database schema or design. Adding, deleting, or modifying a table, a column, the definition thereof, or a relationship or constraint thereon, may be a modification of the database design, schema, model, or structure.

The low-latency data, or a portion thereof, may be stored in the database as one or more rows or records in respective tables. Each record or row of a table may include a respective field or cell corresponding to each column of the table. A field may store a discrete data value. The cardinality of rows of a table, and the values stored therein, may be variable based on the data. Adding, deleting, or modifying rows, or the data stored therein may omit modification of the database design, schema, or structure. The data stored in respective columns may be identified or defined as a measure data, attribute data, or enterprise ontology data (e.g., metadata).

Measure data, or measure values, may include quantifiable or additive numeric values, such as integer or floating-point values, which may include numeric values indicating sizes, amounts, degrees, or the like. A column defined as representing measure values may be referred to herein as a measure or fact. A measure may be a property on which quantitative operations (e.g., sum, count, average, minimum, maximum) may be performed to calculate or determine a result or output.

Attribute data, or attribute values, may include non-quantifiable values, such as text or image data, which may indicate names and descriptions, quantifiable values designated, defined, or identified as attribute data, such as numeric unit identifiers, or a combination thereof. A column defined as including attribute values may be referred to herein as an attribute or dimension. For example, attributes may include text, identifiers, timestamps, or the like.

Enterprise ontology data may include data that defines or describes one or more aspects of the database, such as data that describes one or more aspects of the attributes, measures, rows, columns, tables, relationships, or other aspects of the data or database schema. For example, a portion of the database design, model, or schema may be represented as enterprise ontology data in one or more tables in the database.

Distinctly identifiable data in the low-latency data may be referred to herein as a data portion. For example, the low-latency data stored in the distributed in-memory database 3300 may be referred to herein as a data portion, a table from the low-latency data may be referred to herein as a data portion, a column from the low-latency data may be referred to herein as a data portion, a row or record from the low-latency data may be referred to herein as a data portion, a value from the low-latency data may be referred to herein as a data portion, a relationship defined in the low-latency data may be referred to herein as a data portion, enterprise ontology data describing the low-latency data may be referred to herein as a data portion, or any other distinctly identifiable data, or combination thereof, from the low-latency data may be referred to herein as a data portion.

The distributed in-memory database 3300 may create or add one or more data portions, such as a table, may read from or access one or more data portions, may update or modify one or more data portions, may remove or delete one or more data portions, or a combination thereof. Adding, modifying, or removing data portions may include changes to the data model of the low-latency data. Changing the data model of the low-latency data may include notifying one or more other components of the low-latency data analysis system 3000, such as by sending, or otherwise making available, a message or signal indicating the change. For example, the distributed in-memory database 3300 may create or add a table to the low-latency data and may transmit or send a message or signal indicating the change to the semantic interface unit 3600.

In some implementations, a portion of the low-latency data may represent a data model of an external enterprise database and may omit the data stored in the external enterprise database, or a portion thereof. For example, prioritized data may be cached in the distributed in-memory database 3300 and the other data may be omitted from storage in the distributed in-memory database 3300, which may be stored in the external enterprise database. In some implementations, requesting data from the distributed in-memory database 3300 may include requesting the data, or a portion thereof, from the external enterprise database.

The distributed in-memory database 3300 may receive one or more messages or signals indicating respective data-queries for the low-latency data, or a portion thereof, which may include data-queries for modified, generated, or aggregated data generated based on the low-latency data, or a portion thereof. For example, the distributed in-memory database 3300 may receive a data-query from the semantic interface unit 3600, such as in accordance with a request for data. The data-queries received by the distributed in-memory database 3300 may be agnostic to the distributed configuration of the distributed in-memory database 3300. A data-query, or a portion thereof, may be expressed in accordance with the defined structured query language implemented by the distributed in-memory database 3300. In some implementations, a data-query may be included, such as stored or communicated, in a data-query data structure or container.

The distributed in-memory database 3300 may execute or perform one or more queries to generate or obtain response data responsive to the data-query based on the low-latency data. Unless expressly described, or otherwise clear from context, descriptions herein of a table in the context of performing, processing, or executing a data-query that include accessing, such as reading, writing, or otherwise using, a table, or data from a table, may refer to a table stored, or otherwise maintained, in the low-latency distributed database independently of the data-query or may refer to tabular data obtained, such as generated, in accordance with the data-query.

The distributed in-memory database 3300 may interpret, evaluate, or otherwise process a data-query to generate one or more distributed-queries, which may be expressed in accordance with the defined structured query language. For example, an in-memory database instance of the distributed in-memory database 3300 may be identified as a query coordinator. The query coordinator may generate a query plan, which may include generating one or more distributed-queries, based on the received data-query. The query plan may include query execution instructions for executing one or more queries, or one or more portions thereof, based on the received data-query by the one or more of the in-memory database instances. Generating the query plan may include optimizing the query plan. The query coordinator may distribute, or otherwise make available, the respective portions of the query plan, as query execution instructions, to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining intermediate results data from, one or more other in-memory database instances, in addition to, or instead of, obtaining the intermediate results data from the low-latency data.

The distributed in-memory database 3300 may output, or otherwise make available, the results data to the semantic interface unit 3600.

The enterprise data interface unit 3400 may interface with, or communicate with, an external enterprise data system. For example, the enterprise data interface unit 3400 may receive or access enterprise data from or in an external system, such as an external database. The enterprise data interface unit 3400 may import, evaluate, or otherwise process the enterprise data to populate, create, or modify data stored in the low-latency data analysis system 3000. The enterprise data interface unit 3400 may receive, or otherwise access, the enterprise data from one or more external data sources, such as the external data source portion 2100 shown in FIG. 2, and may represent the enterprise data in the low-latency data analysis system 3000 by importing, loading, or populating the enterprise data as principal data in the distributed in-memory database 3300, such as in one or more low-latency data structures. The enterprise data interface unit 3400 may implement one or more data connectors, which may transfer data between, for example, the external data source and the distributed in-memory database 3300, which may include altering, formatting, evaluating, or manipulating the data.

The enterprise data interface unit 3400 may receive, access, or generate metadata that identifies one or more parameters or relationships for the principal data, such as based on the enterprise data, and may include the generated metadata in the low-latency data stored in the distributed in-memory database 3300. For example, the enterprise data interface unit 3400 may identify characteristics of the principal data such as, attributes, measures, values, unique identifiers, tags, links, keys, or the like, and may include metadata representing the identified characteristics in the low-latency data stored in the distributed in-memory database 3300. The characteristics of the data can be automatically determined by receiving, accessing, processing, evaluating, or interpreting the schema in which the enterprise data is stored, which may include automatically identifying links or relationships between columns, classifying columns (e.g., using column names), and analyzing or evaluating the data.

Distinctly identifiable operative data units or structures representing one or more data portions, one or more entities, users, groups, or organizations represented in the internal data, or one or more aggregations, collections, relations, analytical results, visualizations, or groupings thereof, may be represented in the low-latency data analysis system 3000 as objects. An object may include a unique identifier for the object, such as a fully qualified name. An object may include a name, such as a displayable value, for the object.

For example, an object may represent a user, a group, an entity, an organization, a privilege, a role, a table, a column, a data relationship, a worksheet, a view, a context, an answer, an insight, a pinboard, a tag, a comment, a trigger, a defined variable, a data source, an object-level security rule, a row-level security rule, or any other data capable of being distinctly identified and stored or otherwise obtained in the low-latency data analysis system 3000. An object may represent or correspond with a logical entity. Data describing an object may include data operatively or uniquely identifying data corresponding to, or represented by, the object in the low-latency data analysis system. For example, a column in a table in a database in the low-latency data analysis system may be represented in the low-latency data analysis system as an object and the data describing or defining the object may include data operatively or uniquely identifying the column.

A worksheet (worksheet object), or worksheet table, may be a logical table, or a definition thereof, which may be a collection, a sub-set (such as a subset of columns from one or more tables), or both, of data from one or more data sources, such as columns in one or more tables, such as in the distributed in-memory database 3300. A worksheet, or a definition thereof, may include one or more data organization or manipulation definitions, such as join paths or worksheet-column definitions, which may be user defined. A worksheet may be a data structure that may contain one or more rules or definitions that may define or describe how a respective tabular set of data may be obtained, which may include defining one or more sources of data, such as one or more columns from the distributed in-memory database 3300. A worksheet may be a data source. For example, a worksheet may include references to one or more data sources, such as columns in one or more tables, such as in the distributed in-memory database 3300, and a request for data referencing the worksheet may access the data from the data sources referenced in the worksheet. In some implementations, a worksheet may omit aggregations of the data from the data sources referenced in the worksheet.

An answer (answer object), or report, may be a defined, such as previously generated, request for data, such as a resolved-request. An answer may include information describing a visualization of data responsive to the request for data.

A visualization (visualization object) may be a defined representation or expression of data, such as a visual representation of the data, for presentation to a user or human observer, such as via a user interface. Although described as a visual representation, in some implementations, a visualization may include non-visual aspects, such as auditory or haptic presentation aspects. A visualization may be generated to represent a defined set of data in accordance with a defined visualization type or template (visualization template object), such as in a chart, graph, or tabular form. Example visualization types may include, and are not limited to, chloropleths, cartograms, dot distribution maps, proportional symbol maps, contour/isopleth/isarithmic maps, daysymetric map, self-organizing map, timeline, time series, connected scatter plots, Gantt charts, steam graph/ theme river, arc diagrams, polar area/rose/circumplex charts, Sankey diagrams, alluvial diagrams, pie charts, histograms, tag clouds, bubble charts, bubble clouds, bar charts, radial bar charts, tree maps, scatter plots, line charts, step charts, area charts, stacked graphs, heat maps, parallel coordinates, spider charts, box and whisker plots, mosaic displays, waterfall charts, funnel charts, or radial tree maps. A visualization template may define or describe one or more visualization parameters, such as one or more color parameters. Visualization data for a visualization may include values of one or more of the visualization parameters of the corresponding visualization template.

A view (view object) may be a logical table, or a definition thereof, which may be a collection, a sub-set, or both, of data from one or more data sources, such as columns in one or more tables, such as in the distributed in-memory database 3300. For example, a view may be generated based on an answer, such as by storing the answer as a view. A view may define or describe a data aggregation. A view may be a data source. For example, a view may include references to one or more data sources, such as columns in one or more tables, such as in the distributed in-memory database 3300, which may include a definition or description of an aggregation of the data from a respective data source, and a request for data referencing the view may access the aggregated data, the data from the unaggregated data sources referenced in the worksheet, or a combination thereof. The unaggregated data from data sources referenced in the view defined or described as aggregated data in the view may be unavailable based on the view. A view may be a materialized view or an unmaterialized view. A request for data referencing a materialized view may obtain data from a set of data previously obtained (view-materialization) in accordance with the definition of the view and the request for data. A request for data referencing an unmaterialized view may obtain data from a set of data currently obtained in accordance with the definition of the view and the request for data.

A pinboard (pinboard object), or dashboard, may be a defined collection or grouping of objects, such as visualizations, answers, or insights. Pinboard data for a pinboard may include information associated with the pinboard, which may be associated with respective objects included in the pinboard.

A context (context object) may be a set or collection of data associated with a request for data or a discretely related sequence or series of requests for data or other interactions with the low-latency data analysis system 3000.

A definition may be a set of data describing the structure or organization of a data portion. For example, in the distributed in-memory database 3300, a column definition may define one or more aspects of a column in a table, such as a name of the column, a description of the column, a datatype for the column, or any other information about the column that may be represented as discrete data.

A data source object may represent a source or repository of data accessible by the low-latency data analysis system 3000. A data source object may include data indicating an electronic communication location, such as an address, of a data source, connection information, such as protocol information, authentication information, or a combination thereof, or any other information about the data source that may be represented as discrete data. For example, a data source object may represent a table in the distributed in-memory database 3300 and include data for accessing the table from the database, such as information identifying the database, information identifying a schema within the database, and information identifying the table within the schema within the database. An external data source object may represent an external data source. For example, an external data source object may include data indicating an electronic communication location, such as an address, of an external data source, connection information, such as protocol information, authentication information, or a combination thereof, or any other information about the external data source that may be represented as discrete data.

A sticker (sticker object) may be a description of a classification, category, tag, subject area, or other information that may be associated with one or more other objects such that objects associated with a sticker may be grouped, sorted, filtered, or otherwise identified based on the sticker. In the distributed in-memory database 3300 a tag may be a discrete data portion that may be associated with other data portions, such that data portions associated with a tag may be grouped, sorted, filtered, or otherwise identified based on the tag.

The distributed in-memory ontology unit 3500 generates, maintains, or both, information (ontological data) defining or describing the operative ontological structure of the objects represented in the low-latency data analysis system 3000, such as in the low-latency data stored in the distributed in-memory database 3300, which may include describing attributes, properties, states, or other information about respective objects and may include describing relationships among respective objects.

Objects may be referred to herein as primary objects, secondary objects, or tertiary objects. Other types of objects may be used.

Primary objects may include objects representing distinctly identifiable operative data units or structures representing one or more data portions in the distributed in-memory database 3300, or another data source in the low-latency data analysis system 3000. For example, primary objects may be data source objects, table objects, column objects, relationship objects, or the like. Primary objects may include worksheets, views, filters, such as row-level-security filters and table filters, variables, or the like. Primary objects may be referred to herein as data-objects or queryable-objects.

Secondary objects may be objects representing distinctly identifiable operative data units or structures representing analytical data aggregations, collections, analytical results, visualizations, or groupings thereof, such as pinboard objects, answer objects, insights, visualization objects, and the like. Secondary objects may be referred to herein as analytical-objects.

Tertiary objects may be objects representing distinctly identifiable operative data units or structures representing operational aspects of the low-latency data analysis system 3000, such as one or more entities, users, groups, or organizations represented in the internal data, such as user objects, user-group objects, role objects, sticker objects, and the like.

The distributed in-memory ontology unit 3500 may represent the ontological structure, which may include the objects therein, as a graph having nodes and edges. A node may be a representation of an object in the graph structure of the distributed in-memory ontology unit 3500. A node, representing an object, can include one or more components. The components of a node may be versioned, such as on a per-component basis. For example, a node can include a header component, a content component, or both. A header component may include information about the node. A content component may include the content of the node. An edge may represent a relationship between nodes, which may be directional.

In some implementations, the distributed in-memory ontology unit 3500 graph may include one or more nodes, edges, or both, representing one or more objects, relationships or both, corresponding to a respective internal representation of enterprise data stored in an external enterprise data storage unit, wherein a portion of the data stored in the external enterprise data storage unit represented in the distributed in-memory ontology unit 3500 graph is omitted from the distributed in-memory database 3300.

In some embodiments, the distributed in-memory ontology unit 3500 may generate, modify, or remove a portion of the ontology graph in response to one or more messages, signals, or notifications from one or more of the components of the low-latency data analysis system 3000. For example, the distributed in-memory ontology unit 3500 may generate, modify, or remove a portion of the ontology graph in response to receiving one or more messages, signals, or notifications from the distributed in-memory database 3300 indicating a change to the low-latency data structure. In another example, the distributed in-memory database 3300 may send one or more messages, signals, or notifications indicating a change to the low-latency data structure to the semantic interface unit 3600 and the semantic interface unit 3600 may send one or more messages, signals, or notifications indicating the change to the low-latency data structure to the distributed in-memory ontology unit 3500.

The distributed in-memory ontology unit 3500 may be distributed, in-memory, multi-versioned, transactional, consistent, durable, or a combination thereof. The distributed in-memory ontology unit 3500 is transactional, which may include implementing atomic concurrent, or substantially concurrent, updating of multiple objects. The distributed in-memory ontology unit 3500 is durable, which may include implementing a robust storage that prevents data loss subsequent to or as a result of the completion of an atomic operation. The distributed in-memory ontology unit 3500 is consistent, which may include performing operations associated with a request for data with reference to or using a discrete data set, which may mitigate or eliminate the risk inconsistent results.

The distributed in-memory ontology unit 3500 may generate, output, or both, one or more event notifications. For example, the distributed in-memory ontology unit 3500 may generate, output, or both, a notification, or notifications, in response to a change of the distributed in-memory ontology. The distributed in-memory ontology unit 3500 may identify a portion of the distributed in-memory ontology (graph) associated with a change of the distributed in-memory ontology, such as one or more nodes depending from a changed node, and may generate, output, or both, a notification, or notifications indicating the identified relevant portion of the distributed in-memory ontology (graph). One or more aspects of the low-latency data analysis system 3000 may cache object data and may receive the notifications from the distributed in-memory ontology unit 3500, which may reduce latency and network traffic relative to systems that omit caching object data or omit notifications relevant to changes to portions of the distributed in-memory ontology (graph).

The distributed in-memory ontology unit 3500 may implement prefetching. For example, the distributed in-memory ontology unit 3500 may predictively, such as based on determined probabilistic utility, fetch one or more nodes, such as in response to access to a related node by a component of the low-latency data analysis system 3000.

The distributed in-memory ontology unit 3500 may implement a multi-version concurrency control graph data storage unit. Each node, object, or both, may be versioned. Changes to the distributed in-memory ontology may be reversible. For example, the distributed in-memory ontology may have a first state prior to a change to the distributed in-memory ontology, the distributed in-memory ontology may have a second state subsequent to the change, and the state of the distributed in-memory ontology may be reverted to the first state subsequent to the change, such as in response to the identification of an error or failure associated with the second state.

In some implementations, reverting a node, or a set of nodes, may omit reverting one or more other nodes. In some implementations, the distributed in-memory ontology unit 3500 may maintain a change log indicating a sequential record of changes to the distributed in-memory ontology (graph), such that a change to a node or a set of nodes may be reverted and one or more other changes subsequent to the reverted change may be reverted for consistency.

The distributed in-memory ontology unit 3500 may implement optimistic locking to reduce lock contention times. The use of optimistic locking permits improved throughput of data through the distributed in-memory ontology unit 3500.

The semantic interface unit 3600 may implement procedures and functions to provide a semantic interface between the distributed in-memory database 3300 and one or more of the other components of the low-latency data analysis system 3000.

The semantic interface unit 3600 may implement ontological data management, data-query generation, authentication and access control, object statistical data collection, or a combination thereof.

Ontological data management may include object lifecycle management, object data persistence, ontological modifications, or the like. Object lifecycle management may include creating one or more objects, reading or otherwise accessing one or more objects, updating or modifying one or more objects, deleting or removing one or more objects, or a combination thereof. For example, the semantic interface unit 3600 may interface or communicate with the distributed in-memory ontology unit 3500, which may store the ontological data, object data, or both, to perform object lifecycle management, object data persistence, ontological modifications, or the like.

For example, the semantic interface unit 3600 may receive, or otherwise access, a message, signal, or notification, such as from the distributed in-memory database 3300, indicating the creation or addition of a data portion, such as a table, in the low-latency data stored in the distributed in-memory database 3300, and the semantic interface unit 3600 may communicate with the distributed in-memory ontology unit 3500 to create an object in the ontology representing the added data portion. The semantic interface unit 3600 may transmit, send, or otherwise make available, a notification, message, or signal to the relational search unit 3700 indicating that the ontology has changed.

The semantic interface unit 3600 may receive, or otherwise access, a request message or signal, such as from the relational search unit 3700, indicating a request for information describing changes to the ontology (ontological updates request). The semantic interface unit 3600 may generate and send, or otherwise make available, a response message or signal to the relational search unit 3700 indicating the changes to the ontology (ontological updates response). The semantic interface unit 3600 may identify one or more data portions for indexing based on the changes to the ontology. For example, the changes to the ontology may include adding a table to the ontology, the table including multiple rows, and the semantic interface unit 3600 may identify each row as a data portion for indexing. The semantic interface unit 3600 may include information describing the ontological changes in the ontological updates response. The semantic interface unit 3600 may include one or more data-query definitions, such as data-query definitions for indexing data-queries, for each data portion identified for indexing in the ontological updates response. For example, the data-query definitions may include a sampling data-query, which may be used to query the distributed in-memory database 3300 for sample data from the added data portion, an indexing data-query, which may be used to query the distributed in-memory database 3300 for data from the added data portion, or both.

The semantic interface unit 3600 may receive, or otherwise access, internal signals or messages including data expressing a usage intent, such as data indicating requests to access or modify the low-latency data stored in the distributed in-memory database 3300 (e.g., a request for data). The request to access or modify the low-latency data received by the semantic interface unit 3600 may include a resolved-request. The resolved-request, which may be database and visualization agnostic, may be expressed or communicated as an ordered sequence of tokens, which may represent semantic data. For example, the relational search unit 3700 may tokenize, identify semantics, or both, based on input data, such as input data representing user input, to generate the resolved-request. The resolved-request may include an ordered sequence of tokens that represent the request for data corresponding to the input data, and may transmit, send, or otherwise make accessible, the resolved-request to the semantic interface unit 3600. The semantic interface unit 3600 may process or respond to a received resolved-request.

The semantic interface unit 3600 may process or transform the received resolved-request, which may be, at least in part, incompatible with the distributed in-memory database 3300, to generate one or more corresponding data-queries that are compatible with the distributed in-memory database 3300, which may include generating a proto-query representing the resolved-request, generating a pseudo-query representing the proto-query, and generating the data-query representing the pseudo-query.

The semantic interface unit 3600 may generate a proto-query based on the resolved-request. A proto-query, which may be database agnostic, may be structured or formatted in a form, language, or protocol that differs from the defined structured query language of the distributed in-memory database 3300. Generating the proto-query may include identifying visualization identification data, such as an indication of a type of visualization, associated with the request for data, and generating the proto-query based on the resolved-request and the visualization identification data.

The semantic interface unit 3600 may transform the proto-query to generate a pseudo-query. The pseudo-query, which may be database agnostic, may be structured or formatted in a form, language, or protocol that differs from the defined structured query language of the distributed in-memory database 3300. Generating a pseudo-query may include applying a defined transformation, or an ordered sequence of transformations. Generating a pseudo-query may include incorporating row-level security filters in the pseudo-query.

The semantic interface unit 3600 may generate a data-query based on the pseudo-query, such as by serializing the pseudo-query. The data-query, or a portion thereof, may be structured or formatted using the defined structured query language of the distributed in-memory database 3300. In some implementations, a data-query may be structured or formatted using a defined structured query language of another database, which may differ from the defined structured query language of the distributed in-memory database 3300. Generating the data-query may include using one or more defined rules for expressing respective the structure and content of a pseudo-query in the respective defined structured query language.

The semantic interface unit 3600 may communicate, or issue, the data-query to the distributed in-memory database 3300. In some implementations, processing or responding to a resolved-request may include generating and issuing multiple data-queries to the distributed in-memory database 3300.

The semantic interface unit 3600 may receive results data from the distributed in-memory database 3300 responsive to one or more resolved-requests. The semantic interface unit 3600 may process, format, or transform the results data to obtain visualization data. For example, the semantic interface unit 3600 may identify a visualization for representing or presenting the results data, or a portion thereof, such as based on the results data or a portion thereof. For example, the semantic interface unit 3600 may identifying a bar chart visualization for results data including one measure and attribute.

Although not shown separately in FIG. 3, the semantic interface unit 3600 may include a data visualization unit. In some embodiments, the data visualization unit may be a distinct unit, separate from the semantic interface unit 3600. In some embodiments, the data visualization unit may be included in the system access interface unit 3900. The data visualization unit, the system access interface unit 3900, or a combination thereof, may generate a user interface, or one or more portions thereof. For example, data visualization unit, the system access interface unit 3900, or a combination thereof, may obtain the results data, such as the visualization data, and may generate user interface elements (visualizations) representing the results data.

The semantic interface unit 3600 may implement object-level security, row-level security, or a combination thereof. Object level security may include security associated with an object, such as a table, a column, a worksheet, an answer, or a pinboard. Row-level security may include user-based or group-based access control of rows of data in the low-latency data, the indexes, or both. The semantic interface unit 3600 may implement one or more authentication procedures, access control procedures, or a combination thereof.

The semantic interface unit 3600 may implement one or more user-data integration features. For example, the semantic interface unit 3600 may generate and output a user interface, or a portion thereof, for inputting, uploading, or importing user data, may receive user data, and may import the user data. For example, the user data may be enterprise data.

The semantic interface unit 3600 may implement object statistical data collection. Object statistical data may include, for respective objects, temporal access information, access frequency information, access recency information, access requester information, or the like. For example, the semantic interface unit 3600 may obtain object statistical data as described with respect to the data utility unit 3720, the object utility unit 3810, or both. The semantic interface unit 3600 may send, transmit, or otherwise make available, the object statistical data for data-objects to the data utility unit 3720. The semantic interface unit 3600 may send, transmit, or otherwise make available, the object statistical data for analytical-objects to the object utility unit 3810.

The semantic interface unit 3600 may implement or expose one or more services or application programming interfaces. For example, the semantic interface unit 3600 may implement one or more services for access by the system access interface unit 3900. In some implementations, one or more services or application programming interfaces may be exposed to one or more external devices or systems.

The semantic interface unit 3600 may generate and transmit, send, or otherwise communicate, one or more external communications, such as e-mail messages, such as periodically, in response to one or more events, or both. For example, the semantic interface unit 3600 may generate and transmit, send, or otherwise communicate, one or more external communications including a portable representation, such as a portable document format representation of one or more pinboards in accordance with a defined schedule, period, or interval. In another example, the semantic interface unit 3600 may generate and transmit, send, or otherwise communicate, one or more external communications in response to input data indicating an express request for a communication. In another example, the semantic interface unit 3600 may generate and transmit, send, or otherwise communicate, one or more external communications in response to one or more defined events, such as the expiration of a recency of access period for a user.

Although shown as a single unit in FIG. 3, the relational search unit 3700 may be implemented in a distributed configuration, which may include a primary relational search unit instance and one or more secondary relational search unit instances.

The relational search unit 3700 may generate, maintain, operate, or a combination thereof, one or more indexes, such as one or more of an ontological index, a constituent data index, a control-word index, a numeral index, or a constant index, based on the low-latency data stored in the distributed in-memory database 3300, the low-latency data analysis system 3000, or both. An index may be a defined data structure, or combination of data structures, for storing tokens, terms, or string keys, representing a set of data from one or more defined data sources in a form optimized for searching. For example, an index may be a collection of index shards. In some implementations, an index may be segmented into index segments and the index segments may be sharded into index shards. In some implementations, an index may be partitioned into index partitions, the index partitions may be segmented into index segments and the index segments may be sharded into index shards.

Generating, or building, an index may be performed to create or populate a previously unavailable index, which may be referred to as indexing the corresponding data, and may include regenerating, rebuilding, or reindexing to update or modify a previously available index, such as in response to a change in the indexed data (constituent data).

The ontological index may be an index of data (ontological data) describing the ontological structure or schema of the low-latency data analysis system 3000, the low-latency data stored in the distributed in-memory database 3300, or a combination thereof. For example, the ontological index may include data representing the table and column structure of the distributed in-memory database 3300. The relational search unit 3700 may generate, maintain, or both, the ontological index by communicating with, such as requesting ontological data from, the distributed in-memory ontology unit 3500, the semantic interface unit 3600, or both. Each record in the ontological index may correspond to a respective ontological token, such as a token that identifies a column by name.

The control-word index may be an index of a defined set of control-word tokens. A control-word token may be a character, a symbol, a word, or a defined ordered sequence of characters or symbols, that is identified in one or more grammars of the low-latency data analysis system 3000 as having one or more defined grammatical functions, which may be contextual. For example, the control-word index may include the control-word token "sum", which may be identified in one or more grammars of the low-latency data analysis system 3000 as indicating an additive aggregation. In another example, the control-word index may include the control-word token "top", which may be identified in one or more grammars of the low-latency data analysis system 3000 as indicating a maximal value from an ordered set. In another example, the control-word index may include operator tokens, such as the equality operator token ("="). The constant index may be an index of constant tokens such as "100" or "true". The numeral index may be an index of number word tokens (or named numbers), such as number word tokens for the positive integers between zero and one million, inclusive. For example, "one hundred and twenty eight".

A token may be a word, phrase, character, sequence of characters, symbol, combination of symbols, or the like. A token may represent a data portion in the low-latency data stored in the low-latency data structure. For example, the relational search unit 3700 may automatically generate respective tokens representing the attributes, the measures, the tables, the columns, the values, unique identifiers, tags, links, keys, or any other data portion, or combination of data portions, or a portion thereof. The relational search unit 3700 may classify the tokens, which may include storing token classification data in association with the tokens. For example, a token may be classified as an attribute token, a measure token, a value token, or the like.

The constituent data index may be an index of the constituent data values stored in the low-latency data analysis system 3000, such as in the distributed in-memory database 3300. The relational search unit 3700 may generate, maintain, or both, the constituent data index by communicating with, such as requesting data from, the distributed in-memory database 3300. For example, the relational search unit 3700 may send, or otherwise communicate, a message or signal to the distributed in-memory database 3300 indicating a request to perform an indexing data-query, the relational search unit 3700 may receive response data from the distributed in-memory database 3300 in response to the requested indexing data-query, and the relational search unit 3700 may generate the constituent data index, or a portion thereof, based on the response data. For example, the constituent data index may index data-objects.

An index shard may be used for token searching, such as exact match searching, prefix match searching, substring match searching, or suffix match searching. Exact match searching may include identifying tokens in the index shard that matches a defined target value. Prefix match searching may include identifying tokens in the index shard that include a prefix, or begin with a value, such as a character or string, that matches a defined target value. Substring match searching may include identifying tokens in the index shard that include a value, such as a character or string, that matches a defined target value. Suffix match searching may include identifying tokens in the index shard that include a suffix, or end with a value, such as a character or string, that matches a defined target value. In some implementations, an index shard may include multiple distinct index data structures. For example, an index shard may include a first index data structure optimized for exact match searching, prefix match searching, and suffix match searching, and a second index data structure optimized for substring match searching. Traversing, or otherwise accessing, managing, or using, an index may include identifying one or more of the index shards of the index and traversing the respective index shards. In some implementations, one or more indexes, or index shards, may be distributed, such as replicated on multiple relational search unit instances. For example, the ontological index may be replicated on each relational search unit instance.

The relational search unit 3700 may receive a request for data from the low-latency data analysis system 3000. For example, the relational search unit 3700 may receive data expressing a usage intent indicating the request for data in response to input, such as user input, obtained via a user interface, such as a user interface generated, or partially generated, by the system access interface unit 3900, which may be a user interface operated on an external device, such as one of the client devices 2320, 2340 shown in FIG. 2. In some implementations, the relational search unit 3700 may receive the data expressing the usage intent from the system access interface unit 3900 or from the semantic interface unit 3600. For example, the relational search unit 3700 may receive or access the data expressing the usage intent in a request for data message or signal.

The relational search unit 3700 may process, parse, identify semantics, tokenize, or a combination thereof, the request for data to generate a resolved-request, which may include identifying a database and visualization agnostic ordered sequence of tokens based on the data expressing the usage intent. The data expressing the usage intent, or request for data, may include request data, such as resolved-request data, unresolved request data, or a combination of resolved-request data and unresolved request data. The relational search unit 3700 may identify the resolved-request data. The relational search unit 3700 may identify the unresolved request data and may tokenize the unresolved request data.

Resolved-request data may be request data identified in the data expressing the usage intent as resolved-request data. Each resolved-request data portion may correspond with a respective token in the low-latency data analysis system 3000. The data expressing the usage intent may include information identifying one or more portions of the request data as resolved-request data.

Unresolved request data may be request data identified in the data expressing the usage intent as unresolved request data, or request data for which the data expressing the usage intent omits information identifying the request data as resolved-request data. Unresolved request data may include text or string data, which may include a character, sequence of characters, symbol, combination of symbols, word, sequence of words, phrase, or the like, for which information, such as tokenization binding data, identifying the text or string data as resolved-request data is absent or omitted from the request data. The data expressing the usage intent may include information identifying one or more portions of the request data as unresolved request data. The data expressing the usage intent may omit information identifying whether one or more portions of the request data are resolved-request data. The relational search unit 3700 may identify one or more portions of the request data for which the data expressing the usage intent omits information identifying whether the one or more portions of the request data are resolved-request data as unresolved request data.

For example, the data expressing the usage intent may include a request string and one or more indications that one or more portions of the request string are resolved-request data. One or more portions of the request string that are not identified as resolved-request data in the data expressing the usage intent may be identified as unresolved request data. For example, the data expressing the usage intent may include the request string "example text"; the data expressing the usage intent may include information indicating that the first portion of the request string, "example", is resolved-request data; and the data expressing the usage intent may omit information indicating that the second portion of the request string, "text", is resolved-request data.

The information identifying one or more portions of the request data as resolved-request data may include tokenization binding data indicating a previously identified token corresponding to the respective portion of the request data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used. In some implementations, the data expressing the usage intent may omit the tokenization binding data and may include an identifier that identifies the tokenization binding data.

The relational search unit 3700 may implement or access one or more grammar-specific tokenizers, such as a tokenizer for a defined data-analytics grammar or a tokenizer for a natural-language grammar. For example, the relational search unit 3700 may implement one or more of a formula tokenizer, a row-level-security tokenizer, a data-analytics tokenizer, or a natural language tokenizer. Other tokenizers may be used. In some implementations, the relational search unit 3700 may implement one or more of the grammar-specific tokenizers, or a portion thereof, by accessing another component of the low-latency data analysis system 3000 that implements the respective grammar-specific tokenizer, or a portion thereof. For example, the natural language processing unit 3710 may implement the natural language tokenizer and the relational search unit 3700 may access the natural language processing unit 3710 to implement natural language tokenization.

A tokenizer, such as the data-analytics tokenizer, may parse text or string data (request string), such as string data included in a data expressing the usage intent, in a defined read order, such as from left to right, such as on a character-by-character or symbol-by-symbol basis. For example, a request string may include a single character, symbol, or letter, and tokenization may include identifying one or more tokens matching, or partially matching, the input character.

Tokenization may include parsing the request string to identify one or more words or phrases. For example, the request string may include a sequence of characters, symbols, or letters, and tokenization may include parsing the sequence of characters in a defined order, such as from left to right, to identify distinct words or terms and identifying one or more tokens matching the respective words. In some implementations, word or phrase parsing may be based on one or more of a set of defined delimiters, such as a whitespace character, a punctuation character, or a mathematical operator.

The relational search unit 3700 may traverse one or more of the indexes to identify one or more tokens corresponding to a character, word, or phrase identified in request string. Tokenization may include identifying multiple candidate tokens matching a character, word, or phrase identified in the request string. Candidate tokens may be ranked or ordered, such as based on probabilistic utility.

Tokenization may include match-length maximization. Match-length maximization may include ranking or ordering candidate matching tokens in descending magnitude order. For example, the longest candidate token, having the largest cardinality of characters or symbols, matching the request string, or a portion thereof, may be the highest ranked candidate token. For example, the request string may include a sequence of words or a semantic phrase, and tokenization may include identifying one or more tokens matching the input semantic phrase. In another example, the request string may include a sequence of phrases, and tokenization may include identifying one or more tokens matching the input word sequence. In some implementations, tokenization may include identifying the highest ranked candidate token for a portion of the request string as a resolved token for the portion of the request string.

The relational search unit 3700 may implement one or more finite state machines. For example, tokenization may include using one or more finite state machines. A finite state machine may model or represent a defined set of states and a defined set of transitions between the states. A state may represent a condition of the system represented by the finite state machine at a defined temporal point. A finite state machine may transition from a state (current state) to a subsequent state in response to input (e.g., input to the finite state machine). A transition may define one or more actions or operations that the relational search unit 3700 may implement. One or more of the finite state machines may be non-deterministic, such that the finite state machine may transition from a state to zero or more subsequent states.

The relational search unit 3700 may generate, instantiate, or operate a tokenization finite state machine, which may represent the respective tokenization grammar. Generating, instantiating, or operating a finite state machine may include operating a finite state machine traverser for traversing the finite state machine. Instantiating the tokenization finite state machine may include entering an empty state, indicating the absence of received input. The relational search unit 3700 may initiate or execute an operation, such as an entry operation, corresponding to the empty state in response to entering the empty state. Subsequently, the relational search unit 3700 may receive input data, and the tokenization finite state machine may transition from the empty state to a state corresponding to the received input data. In some embodiments, the relational search unit 3700 may initiate one or more data-queries in response to transitioning to or from a respective state of a finite state machine. In the tokenization finite state machine, a state may represent a possible next token in the request string. The tokenization finite state machine may transition between states based on one or more defined transition weights, which may indicate a probability of transiting from a state to a subsequent state.

The tokenization finite state machine may determine tokenization based on probabilistic path utility. Probabilistic path utility may rank or order multiple candidate traversal paths for traversing the tokenization finite state machine based on the request string. The candidate paths may be ranked or ordered based on one or more defined probabilistic path utility metrics, which may be evaluated in a defined sequence. For example, the tokenization finite state machine may determine probabilistic path utility by evaluating the weights of the respective candidate transition paths, the lengths of the respective candidate transition paths, or a combination thereof. In some implementations, the weights of the respective candidate transition paths may be evaluated with high priority relative to the lengths of the respective candidate transition paths.

In some implementations, one or more transition paths evaluated by the tokenization finite state machine may include a bound state such that the candidate tokens available for tokenization of a portion of the request string may be limited based on the tokenization of a previously tokenized portion of the request string.

Tokenization may include matching a portion of the request string to one or more token types, such as a constant token type, a column name token type, a value token type, a control-word token type, a date value token type, a string value token type, or any other token type defined by the low-latency data analysis system 3000. A constant token type may be a fixed, or invariant, token type, such as a numeric value. A column name token type may correspond with a name of a column in the data model. A value token type may correspond with an indexed data value. A control-word token type may correspond with a defined set of control-words. A date value token type may be similar to a control-word token type and may correspond with a defined set of control-words for describing temporal information. A string value token type may correspond with an unindexed value.

Token matching may include ordering or weighting candidate token matches based on one or more token matching metrics. Token matching metrics may include whether a candidate match is within a defined data scope, such as a defined set of tables, wherein a candidate match outside the defined data scope (out-of-scope) may be ordered or weighted lower than a candidate match within the defined data scope (in-scope). Token matching metrics may include whether, or the degree to which, a candidate match increases query complexity, such as by spanning multiple roots, wherein a candidate match that increases complexity may be ordered or weighted lower than a candidate match that does not increase complexity or increases complexity to a lesser extent. Token matching metrics may include whether the candidate match is an exact match or a partial match, wherein a candidate match that is a partial may be ordered or weighted lower than a candidate match that is an exact match. In some implementations, the cardinality of the set of partial matches may be limited to a defined value.

Token matching metrics may include a token score (TokenScore), wherein a candidate match with a relatively low token score may be ordered or weighted lower than a candidate match with a relatively high token score. The token score for a candidate match may be determined based on one or more token scoring metrics. The token scoring metrics may include a finite state machine transition weight metric (FSMScore), wherein a weight of transitioning from a current state of the tokenization finite state machine to a state indicating a candidate matching token is the finite state machine transition weight metric. The token scoring metrics may include a cardinality penalty metric (CardinalityScore), wherein a cardinality of values (e.g., unique values) corresponding to the candidate matching token is used as a penalty metric (inverse cardinality), which may reduce the token score. The token scoring metrics may include an index utility metric (IndexScore), wherein a defined utility value, such as one, associated with an object, such as a column wherein the matching token represents the column or a value from the column, is the index utility metric. In some implementations, the defined utility values may be configured, such as in response to user input, on a per object (e.g., per column) basis. The token scoring metrics may include a usage metric (UBRScore). The usage metric may be determined based on a usage based ranking index, one or more usage ranking metrics, or a combination thereof. Determining the usage metric (UBRScore) may include determining a usage boost value (UBRBoost). The token score may be determined based on a defined combination of token scoring metrics. For example, determining the token score may be expressed as the following:

$$TokenScore = FSMScore * (IndexScore + UBRScore * UBRBoost) + Min(CardinalityScore, 1).$$

Token matching may include grouping candidate token matches by match type, ranking or ordering on a per-match type basis based on token score, and ranking or ordering the match types. For example, the match types may include a first match type for exact matches (having the highest match type priority order), a second match type for prefix matches on ontological data (having a match type priority order lower than the first match type), a third match type for substring matches on ontological data and prefix matches on data values (having a match type priority order lower than the second match type), a fourth match type for substring matches on data values (having a match type priority order lower than the third match type), and a fifth match type for matches omitted from the first through fourth match types (having a match type priority order lower than the fourth match type). Other match types and match type orders may be used.

Tokenization may include ambiguity resolution. Ambiguity resolution may include token ambiguity resolution, join-path ambiguity resolution, or both. In some implementations, ambiguity resolution may cease tokenization in response to the identification of an automatic ambiguity resolution error or failure.

Token ambiguity may correspond with identifying two or more exactly matching candidate matching tokens. Token ambiguity resolution may be based on one or more token ambiguity resolution metrics. The token ambiguity resolution metrics may include using available previously resolved token matching or binding data and token ambiguity may be resolved in favor of available previously resolved token matching or binding data, other relevant tokens resolved from the request string, or both. The token ambiguity resolution may include resolving token ambiguity in favor of integer constants. The token ambiguity resolution may include resolving token ambiguity in favor of control-words, such as for tokens at the end of a request for data, such as last, that are not being edited.

Join-path ambiguity may correspond with identifying matching tokens having two or more candidate join paths. Join-path ambiguity resolution may be based on one or more join-path ambiguity resolution metrics. The join-path ambiguity resolution metrics may include using available previously resolved join-path binding data and join-path ambiguity may be resolved in favor of available previously resolved join-paths. The join-path ambiguity resolution may include favoring join paths that include in-scope objects over join paths that include out-of-scope objects. The join-path ambiguity resolution metrics may include a complexity minimization metric, which may favor a join path that omits or avoids increasing complexity over join paths that increase complexity, such as a join path that may introduce a chasm trap.

The relational search unit 3700 may identify a resolved-request based on the request string. The resolved-request, which may be database and visualization agnostic, may be expressed or communicated as an ordered sequence of tokens representing the request for data indicated by the request string. The relational search unit 3700 may instantiate, or generate, one or more resolved-request objects. For example, the relational search unit 3700 may create or store a resolved-request object corresponding to the resolved-request in the distributed in-memory ontology unit 3500. The relational search unit 3700 may transmit, send, or otherwise make available, the resolved-request to the semantic interface unit 3600.

In some implementations, the relational search unit 3700 may transmit, send, or otherwise make available, one or more resolved-requests, or portions thereof, to the semantic interface unit 3600 in response to finite state machine transitions. For example, the relational search unit 3700 may instantiate a search object in response to a first transition of a finite state machine. The relational search unit 3700 may include a first search object instruction in the search object in response to a second transition of the finite state machine. The relational search unit 3700 may send the search object including the first search object instruction to the semantic interface unit 3600 in response to the second transition of the finite state machine. The relational search unit 3700 may include a second search object instruction in the search object in response to a third transition of the finite state machine. The relational search unit 3700 may send the search object including the search object instruction, or a combination of the first search object instruction and the second search object instruction, to the semantic interface unit 3600 in response to the third transition of the finite state machine. The search object instructions may be represented using any annotation, instruction, text, message, list, pseudo-code, comment, or the like, or any combination thereof that may be converted, transcoded, or translated into structured search instructions for retrieving data from the low-latency data.

The relational search unit 3700 may provide an interface to permit the creation of user-defined syntax. For example, a user may associate a string with one or more tokens. Accordingly, when the string is entered, the pre-associated tokens are returned in lieu of searching for tokens to match the input.

The relational search unit 3700 may include a localization unit (not expressly shown). The localization, globalization, regionalization, or internationalization, unit may obtain source data expressed in accordance with a source expressive-form and may output destination data representing the source data, or a portion thereof, and expressed using a destination expressive-form. The data expressive-forms, such as the source expressive-form and the destination expressive-form, may include regional or customary forms of expression, such as numeric expression, temporal expression, currency expression, alphabets, natural-language elements, measurements, or the like. For example, the source expressive-form may be expressed using a canonical-form, which may include using a natural-language, which may be based on English, and the destination expressive-form may be expressed using a locale-specific form, which may include using another natural-language, which may be a natural-language that differs from the canonical-language. In another example, the destination expressive-form and the source expressive-form may be locale-specific expressive-forms and outputting the destination expressive-form representation of the source expressive-form data may include obtaining a canonical-form representation of the source expressive-form data and obtaining the destination expressive-form representation based on the canonical-form representation. Although, for simplicity and clarity, the grammars described herein, such as the data-analytics grammar and the natural language search grammar, are described with relation to the canonical expressive-form, the implementation of the respective grammars, or portions thereof, described herein may implement locale-specific expressive-forms. For example, the data-analytics tokenizer may include multiple locale-specific data-analytics tokenizers.

The natural language processing unit 3710 may receive input data including a natural language string, such as a natural language string generated in accordance with user input. The natural language string may represent a data request expressed in an unrestricted natural language form, for which data identified or obtained prior to, or in conjunction with, receiving the natural language string by the natural language processing unit 3710 indicating the semantic structure, correlation to the low-latency data analysis system 3000, or both, for at least a portion of the natural language string is unavailable or incomplete. Although not shown separately in FIG. 3, in some implementations, the natural language string may be generated or determined based on processing an analog signal, or a digital representation thereof, such as an audio stream or recording or a video stream or recording, which may include using speech-to-text conversion.

The natural language processing unit 3710 may analyze, process, or evaluate the natural language string, or a portion thereof, to generate or determine the semantic structure, correlation to the low-latency data analysis system 3000, or both, for at least a portion of the natural language string. For example, the natural language processing unit 3710 may identify one or more words or terms in the natural language string and may correlate the identified words to tokens defined in the low-latency data analysis system 3000. In another example, the natural language processing unit 3710 may identify a semantic structure for the natural language string, or a portion thereof. In another example, the natural language processing unit 3710 may identify a probabilistic intent for the natural language string, or a portion thereof, which may correspond to an operative feature of the low-latency data analysis system 3000, such as retrieving data from the internal data, analyzing data the internal data, or modifying the internal data.

The natural language processing unit 3710 may send, transmit, or otherwise communicate request data indicating the tokens, relationships, semantic data, probabilistic intent, or a combination thereof or one or more portions thereof, identified based on a natural language string to the relational search unit 3700.

The data utility unit 3720 may receive, process, and maintain user-agnostic utility data, such as system configuration data, user-specific utility data, such as utilization data, or both user-agnostic and user-specific utility data. The utility data may indicate whether a data portion, such as a column, a record, an insight, or any other data portion, has high utility or low utility within the system, such across all users of the system. For example, the utility data may indicate that a defined column is a high-utility column or a low-utility column. The data utility unit 3720 may store the utility data, such as using the low-latency data structure. For example, in response to a user using, or accessing, a data portion, data utility unit 3720 may store utility data indicating the usage, or access, event for the data portion, which may include incrementing a usage event counter associated with the data portion. In some embodiments, the data utility unit 3720 may receive the information indicating the usage, or access, event for the data portion from the insight unit 3730, and the usage, or access, event for the data portion may indicate that the usage is associated with an insight.

The data utility unit 3720 may receive a signal, message, or other communication, indicating a request for utility information. The request for utility information may indicate an object or data portion. The data utility unit 3720 may determine, identify, or obtain utility data associated with the identified object or data portion. The data utility unit 3720 may generate and send utility response data responsive to the request that may indicate the utility data associated with the identified object or data portion.

The data utility unit 3720 may generate, maintain, operate, or a combination thereof, one or more indexes, such as one or more of a usage (or utility) index, a resolved-request index, or a phrase index, based on the low-latency data stored in the distributed in-memory database 3300, the low-latency data analysis system 3000, or both.

The insight unit 3730 may automatically identify one or more insights, which may be data other than data expressly requested by a user, and which may be identified and prioritized, or both, based on probabilistic utility.

The object search unit 3800 may generate, maintain, operate, or a combination thereof, one or more object-indexes, which may be based on the analytical-objects represented in the low-latency data analysis system 3000, or a portion thereof, such as pinboards, answers, and worksheets. An object-index may be a defined data structure, or combination of data structures, for storing analytical-object data in a form optimized for searching. Although shown as a single unit in FIG. 3, the object search unit 3800 may interface with a distinct, separate, object indexing unit (not expressly shown).

The object search unit 3800 may include an object-index population interface, an object-index search interface, or both. The object-index population interface may obtain and store, load, or populate analytical-object data, or a portion thereof, in the object-indexes. The object-index search interface may efficiently access or retrieve analytical-object data from the object-indexes such as by searching or traversing the object-indexes, or one or more portions thereof. In some implementations, the object-index population interface, or a portion thereof, may be a distinct, independent unit.

The object-index population interface may populate, update, or both the object-indexes, such as periodically, such as in accordance with a defined temporal period, such as thirty minutes. Populating, or updating, the object-indexes may include obtaining object indexing data for indexing the analytical-objects represented in the low-latency data analysis system 3000. For example, the object-index population interface may obtain the analytical-object indexing data, such as from the distributed in-memory ontology unit 3500. Populating, or updating, the object-indexes may include generating or creating an indexing data structure representing an object. The indexing data structure for representing an object may differ from the data structure used for representing the object in other components of the low-latency data analysis system 3000, such as in the distributed in-memory ontology unit 3500.

The object indexing data for an analytical-object may be a subset of the object data for the analytical-object. The object indexing data for an analytical-object may include an object identifier for the analytical-object uniquely identifying the analytical-object in the low-latency data analysis system 3000, or in a defined data-domain within the low-latency data analysis system 3000. The low-latency data analysis system 3000 may uniquely, unambiguously, distinguish an object from other objects based on the object identifier associated with the object. The object indexing data for an analytical-object may include data non-uniquely identifying the object. The low-latency data analysis system 3000 may identify one or more analytical-objects based on the non-uniquely identifying data associated with the respective objects, or one or more portions thereof. In some implementations, an object identifier may be an ordered combination of non-uniquely identifying object data that, as expressed in the ordered combination, is uniquely identifying. The low-latency data analysis system 3000 may enforce the uniqueness of the object identifiers.

Populating, or updating, the object-indexes may include indexing the analytical-object by including or storing the object indexing data in the object-indexes. For example, the object indexing data may include data for an analytical-object, the object-indexes may omit data for the analytical-object, and the object-index population interface may include or store the object indexing data in an object-index. In another example, the object indexing data may include data for an analytical-object, the object-indexes may include data for the analytical-object, and the object-index population interface may update the object indexing data for the analytical-object in the object-indexes in accordance with the object indexing data.

Populating, or updating, the object-indexes may include obtaining object utility data for the analytical-objects represented in the low-latency data analysis system 3000. For example, the object-index population interface may obtain the object utility data, such as from the object utility unit 3810. The object-index population interface may include the object utility data in the object-indexes in association with the corresponding objects.

In some implementations, the object-index population interface may receive, obtain, or otherwise access the object utility data from a distinct, independent, object utility data population unit, which may read, obtain, or otherwise access object utility data from the object utility unit 3810 and may send, transmit, or otherwise provide, the object utility data to the object search unit 3800. The object utility data population unit may send, transmit, or otherwise provide, the object utility data to the object search unit 3800 periodically, such as in accordance with a defined temporal period, such as thirty minutes.

The object-index search interface may receive, access, or otherwise obtain data expressing a usage intent with respect to the low-latency data analysis system 3000, which may represent a request to access data in the low-latency data analysis system 3000, which may represent a request to access one or more analytical-objects represented in the low-latency data analysis system 3000. The object-index search interface may generate one or more object-index queries based on the data expressing the usage intent. The object-index search interface may send, transmit, or otherwise make available the object-index queries to one or more of the object-indexes.

The object-index search interface may receive, obtain, or otherwise access object search results data indicating one or more analytical-objects identified by searching or traversing the object-indexes in accordance with the object-index queries. The object-index search interface may sort or rank the object search results data based on probabilistic utility in accordance with the object utility data for the analytical-objects in the object search results data. In some implementations, the object-index search interface may include one or more object search ranking metrics with the object-index queries and may receive the object search results data sorted or ranked based on probabilistic utility in accordance with the object utility data for the objects in the object search results data and in accordance with the object search ranking metrics.

For example, the data expressing the usage intent may include a user identifier, and the object search results data may include object search results data sorted or ranked based on probabilistic utility for the user. In another example, the data expressing the usage intent may include a user identifier and one or more search terms, and the object search results data may include object search results data sorted or ranked based on probabilistic utility for the user identified by searching or traversing the object-indexes in accordance with the search terms.

The object-index search interface may generate and send, transmit, or otherwise make available the sorted or ranked object search results data to another component of the low-latency data analysis system 3000, such as for further processing and display to the user.

The object utility unit 3810 may receive, process, and maintain user-specific object utility data for objects represented in the low-latency data analysis system 3000. The user-specific object utility data may indicate whether an object has high utility or low utility for the user.

The object utility unit 3810 may store the user-specific object utility data, such as on a per-object basis, a per-activity basis, or both. For example, in response to data indicating an object access activity, such as a user using, viewing, or otherwise accessing, an object, the object utility unit 3810 may store user-specific object utility data indicating the object access activity for the object, which may include incrementing an object access activity counter associated with the object, which may be a user-specific object access activity counter. In another example, in response to data indicating an object storage activity, such as a user storing an object, the object utility unit 3810 may store user-specific object utility data indicating the object storage activity for the object, which may include incrementing a storage activity counter associated with the object, which may be a user-specific object storage activity counter. The user-specific object utility data may include temporal information, such as a temporal location identifier associated with the object activity. Other information associated with the object activity may be included in the object utility data.

The object utility unit 3810 may receive a signal, message, or other communication, indicating a request for object utility information. The request for object utility information may indicate one or more objects, one or more users, one or more activities, temporal information, or a combination thereof. The request for object utility information may indicate a request for object utility data, object utility counter data, or both.

The object utility unit 3810 may determine, identify, or obtain object utility data in accordance with the request for object utility information. The object utility unit 3810 may generate and send object utility response data responsive to the request that may indicate the object utility data, or a portion thereof, in accordance with the request for object utility information.

For example, a request for object utility information may indicate a user, an object, temporal information, such as information indicating a temporal span, and an object activity, such as the object access activity. The request for object utility information may indicate a request for object utility counter data. The object utility unit 3810 may determine, identify, or obtain object utility counter data associated with the user, the object, and the object activity having a temporal location within the temporal span, and the object utility unit 3810 may generate and send object utility response data including the identified object utility counter data.

In some implementations, a request for object utility information may indicate multiple users, or may omit indicating a user, and the object utility unit 3810 may identify user-agnostic object utility data aggregating the user-specific object utility data. In some implementations, a request for object utility information may indicate multiple objects, may omit indicating an object, or may indicate an object type, such as answer, pinboard, or worksheet, and the object utility unit 3810 may identify the object utility data by aggregating the object utility data for multiple objects in accordance with the request. Other object utility aggregations may be used.

The system configuration unit 3820 implement or apply one or more low-latency data analysis system configurations to enable, disable, or configure one or more operative features of the low-latency data analysis system 3000. The system configuration unit 3820 may store data representing or defining the one or more low-latency data analysis system configurations. The system configuration unit 3820 may receive signals or messages indicating input data, such as input data generated via a system access interface, such as a user interface, for accessing or modifying the low-latency data analysis system configurations. The system configuration unit 3820 may generate, modify, delete, or otherwise maintain the low-latency data analysis system configurations, such as in response to the input data. The system configuration unit 3820 may generate or determine output data, and may output the output data, for a system access interface, or a portion or portions thereof, for the low-latency data analysis system configurations, such as for presenting a user interface for the low-latency data analysis system configurations. Although not shown in FIG. 3, the system configuration unit 3820 may communicate with a repository, such as an external centralized repository, of low-latency data analysis system configurations; the system configuration unit 3820 may receive one or more low-latency data analysis system configurations from the repository, and may control or configure one or more operative features of the low-latency data analysis system 3000 in response to receiving one or more low-latency data analysis system configurations from the repository.

The user customization unit 3830 may receive, process, and maintain user-specific utility data, such as user defined configuration data, user defined preference data, or a combination thereof. The user-specific utility data may indicate whether a data portion, such as a column, a record, autonomous-analysis data, or any other data portion or object, has high utility or low utility to an identified user. For example, the user-specific utility data may indicate that a defined column is a high-utility column or a low-utility column. The user customization unit 3830 may store the user-specific utility data, such as using the low-latency data structure. The user-specific utility data may include feedback data, such as feedback indicating user input expressly describing or representing the utility of a data portion or object in response to utilization of the data portion or object, such as positive feedback indicating high utility or negative feedback indicating low utility. The user customization unit 3830 may store the feedback in association with a user identifier. The user customization unit 3830 may store the feedback in association with the context in which feedback was obtained. The user customization data, or a portion thereof, may be stored in an in-memory storage unit of the low-latency data analysis system. In some implementations, the user customization data, or a portion thereof, may be stored in the persistent storage unit 3930.

The system access interface unit 3900 may interface with, or communicate with, a system access unit (not shown in FIG. 3), which may be a client device, a user device, or another external device or system, or a combination thereof, to provide access to the internal data, features of the low-latency data analysis system 3000, or a combination thereof. For example, the system access interface unit 3900 may receive signals, message, or other communications representing interactions with the internal data, such as data expressing a usage intent and may output response messages, signals, or other communications responsive to the received requests.

The system access interface unit 3900 may generate data for presenting a user interface, or one or more portions thereof, for the low-latency data analysis system 3000. For example, the system access interface unit 3900 may generate instructions for rendering, or otherwise presenting, the user interface, or one or more portions thereof and may transmit, or otherwise make available, the instructions for rendering, or otherwise presenting, the user interface, or one or more portions thereof to the system access unit, for presentation to a user of the system access unit. For example, the system access unit may present the user interface via a web browser or a web application and the instructions may be in the form of HTML, JavaScript, or the like.

In an example, the system access interface unit 3900 may include a data-analytics field user interface element in the user interface. The data-analytics field user interface element may be an unstructured string user input element or field. The system access unit may display the unstructured string user input element. The system access unit may receive input data, such as user input data, corresponding to the unstructured string user input element. The system access unit may transmit, or otherwise make available, the unstructured string user input to the system access interface unit 3900. The user interface may include other user interface elements and the system access unit may transmit, or otherwise make available, other user input data to the system access interface unit 3900.

The system access interface unit 3900 may obtain the user input data, such as the unstructured string, from the system access unit. The system access interface unit 3900 may transmit, or otherwise make available, the user input data to one or more of the other components of the low-latency data analysis system 3000.

In some embodiments, the system access interface unit 3900 may obtain the unstructured string user input as a sequence of individual characters or symbols, and the system access interface unit 3900 may sequentially transmit, or otherwise make available, individual or groups of characters or symbols of the user input data to one or more of the other components of the low-latency data analysis system 3000.

In some embodiments, system access interface unit 3900 may obtain the unstructured search string user input may as a sequence of individual characters or symbols, the system access interface unit 3900 may aggregate the sequence of individual characters or symbols, and may sequentially transmit, or otherwise make available, a current aggregation of the received user input data to one or more of the other components of the low-latency data analysis system 3000, in response to receiving respective characters or symbols from the sequence, such as on a per-character or per-symbol basis.

The real-time collaboration unit 3910 may receive signals or messages representing input received in accordance with multiple users, or multiple system access devices, associated with a collaboration context or session, may output data, such as visualizations, generated or determined by the low-latency data analysis system 3000 to multiple users associated with the collaboration context or session, or both. The real-time collaboration unit 3910 may receive signals or messages representing input received in accordance with one or more users indicating a request to establish a collaboration context or session, and may generate, maintain, or modify collaboration data representing the collaboration context or session, such as a collaboration session identifier. The real-time collaboration unit 3910 may receive signals or messages representing input received in accordance with one or more users indicating a request to participate in, or otherwise associate with, a currently active collaboration context or session, and may associate the one or more users with the currently active collaboration context or session. In some implementations, the input, output, or both, of the real-time collaboration unit 3910 may include synchronization data, such as temporal data, that may be used to maintain synchronization, with respect to the collaboration context or session, among the low-latency data analysis system 3000 and one or more system access devices associated with, or otherwise accessing, the collaboration context or session.

The third-party integration unit 3920 may include an electronic communication interface, such as an application programming interface (API), for interfacing or communicating between an external, such as third-party, application or system, and the low-latency data analysis system 3000. For example, the third-party integration unit 3920 may include an electronic communication interface to transfer data between the low-latency data analysis system 3000 and one or more external applications or systems, such as by importing data into the low-latency data analysis system 3000 from the external applications or systems or exporting data from the low-latency data analysis system 3000 to the external applications or systems. For example, the third-party integration unit 3920 may include an electronic communication interface for electronic communication with an external exchange, transfer, load (ETL) system, which may import data into the low-latency data analysis system 3000 from an external data source or may export data from the low-latency data analysis system 3000 to an external data repository. In another example, the third-party integration unit 3920 may include an electronic communication interface for electronic communication with external machine learning analysis software, which may export data from the low-latency data analysis system 3000 to the external machine learning analysis software and may import data into the low-latency data analysis system 3000 from the external machine learning analysis software. The third-party integration unit 3920 may transfer data independent of, or in conjunction with, the system access interface unit 3900, the enterprise data interface unit 3400, or both.

The persistent storage unit 3930 may include an interface for storing data on, accessing data from, or both, one or more persistent data storage devices or systems. For example, the persistent storage unit 3930 may include one or more persistent data storage devices, such as the static memory 1200 shown in FIG. 1. Although shown as a single unit in FIG. 3, the persistent storage unit 3930 may include multiple components, such as in a distributed or clustered configuration. The persistent storage unit 3930 may include one or more internal interfaces, such as electronic communication or application programming interfaces, for receiving data from, sending data to, or both other components of the low-latency data analysis system 3000. The persistent storage unit 3930 may include one or more external interfaces, such as electronic communication or application programming interfaces, for receiving data from, sending data to, or both, one or more external systems or devices, such as an external persistent storage system. For example, the persistent storage unit 3930 may include an internal interface for obtaining key-value tuple data from other components of the low-latency data analysis system 3000, an external interface for sending the key-value tuple data to, or storing the key-value tuple data on, an external persistent storage system, an external interface for obtaining, or otherwise accessing, the key-value tuple data from the external persistent storage system, and an internal key-value tuple data for sending, or otherwise making available, the key-value tuple data to other components of the low-latency data analysis system 3000. In another example, the persistent storage unit 3930 may include a first external interface for storing data on, or obtaining data from, a first external persistent storage system, and a second external interface for storing data on, or obtaining data from, a second external persistent storage system.

Figure 4:
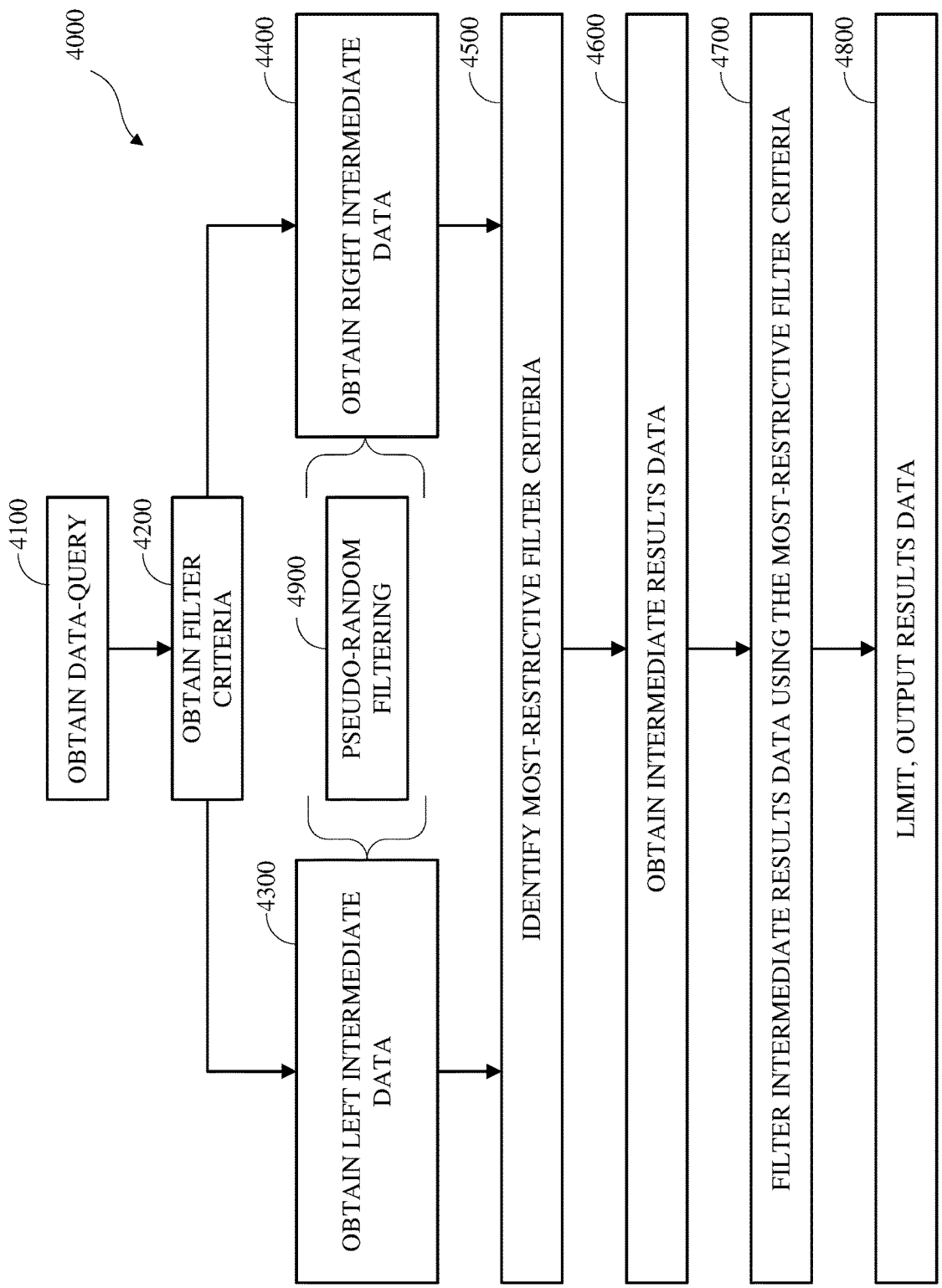
FIG. 4 is a flowchart of an example of a method of distributed pseudo-random subset generation in a distributed in-memory database.

FIG. 4 is a flowchart of an example of a method of distributed pseudo-random subset generation 4000 in a distributed in-memory database. Distributed pseudo-random subset generation 4000 may be implemented in a low-latency data analysis system, such as the low-latency data analysis system 3000 shown in FIG. 3, including a distributed in-memory database, such as the distributed in-memory database 3300 shown in FIG. 3.

Distributed pseudo-random subset generation 4000 includes obtaining a data-query at 4100, obtaining filter criteria at 4200, obtaining left intermediate data 4300, obtaining right intermediate data 4400, identifying a most-restrictive filter criteria at 4500, obtaining intermediate results data at 4600, filtering the intermediate results data at 4700, and outputting results data at 4800.

A data-query is obtained by the distributed in-memory database at 4100. For example, the data-query may be obtained from another component of the low-latency data analysis system, such as a semantic interface, such as the semantic interface 3600 shown in FIG. 3. In some embodiments, the data-query may be a sub-query generated by the distributed in-memory database for performing another data-query. The data-query may be expressed in accordance with a defined structured query language, such as the defined structured query language of the distributed low-latency database. The data-query may represent data expressing the usage intent, or a portion thereof, obtained by the low-latency data analysis system. The data-query, or a portion thereof, may be obtained in response to receiving the data expressing the usage intent with respect to the low-latency data analysis system.

The data-query, or a portion thereof, may indicate one or more data sources, such as tables from the distributed in-memory database. For example, the data-query, or a portion thereof, may identify, as a first data source, a first table from the distributed in-memory database, wherein the first table includes one or more columns, such as a first column. In some embodiments, the data-query, or a portion thereof, may identify, as a second data source, a second table from the distributed in-memory database, wherein the second table includes one or more columns, such as a second column.

The data-query, or a portion thereof, may include a join clause. The join clause may indicate that execution of the data-query data includes accessing and combining data from multiple tables in accordance with the join clause, such as by joining the first table and the second table indicated by the data-query on the first column and the second column. Although described with respect to joining the first table and the second table on a first column of the first table and a second column of the second table, the join clause, which may be a full outer join, or equi-join, clause, may identify two or more join pairs, wherein a join pair indicates a column of the first table and a corresponding column of the second table on which to join the first table and the second table. For example, the join clause may indicate a join on a first column of the first table and a second column of the second table and on a third column of the first table and a fourth column of the second table. For example, the join clause may be expressed as "Table1 JOIN Table2 ON Table1.Column1=Table2.Column2 AND Table1.Column3=Table2.Column4". In another example, the join clause may be expressed as "JOIN Table1(Column1, Column3) AND Table2(Column2,Column4)". Although distributed pseudo-random subset generation 4000 is described in the context of a data-query that includes a join clause, distributed pseudo-random subset generation 4000 may be performed for a data-query that omits a join clause.

The data-query, or a portion thereof, may include a limit clause. The limit clause may include a limit value or threshold. For example, the limit value may be an integer value indicating a maximum cardinality, or number, of rows that may be output responsive to the data-query.

Filter criteria is obtained at 4200. In some embodiments, the filter criteria may be one or more bitmasks. A bitmask, or hash mask, is an ordered sequence of bits having a defined size or cardinality of bits, such as eight bits (8-bit, or byte). Another size bitmask may be used. Obtaining the filter criteria may include obtaining an unrestricted filter criterion. For example, obtaining the bitmasks includes obtaining a first bitmask, which may be referred to herein as an unrestricted bitmask. For example, the values of the bits of the unrestricted bitmask may be zeros, such that the unrestricted 8-bit bitmask may be expressed as 00000000. Bitmasks may be more restrictive than the unrestricted bitmask. The strength or restrictiveness of a bitmask corresponds with the cardinality, or number, of trailing bits that have the value of one. In some implementations, the bits of the unrestricted bitmask may be ones and more restrictive bitmask may have trailing zero-value bits. In some implementations, the restrictiveness of a bitmask may correspond with the values of leading bits.

Obtaining the filter criteria may include obtaining a more restrictive filter criterion. For example, obtaining the bitmasks includes obtaining a second bitmask, which may be referred to herein as a restricted bitmask, which may be a minimally more restrictive bitmask relative to the unrestrictive bitmask. The restricted bitmask may be more restrictive, such as minimally more restrictive, than the unrestricted bitmask. For example, the values of the leading bits of the restricted bitmask may be zeros and the value of a trailing bit may be one, such that the restricted bitmask may be expressed as 00000001. In some implementations, obtaining the bitmasks at 4200 may omit obtaining the unrestricted bitmask. In some implementations, the restricted bitmask may be obtained as a sum of one, or a one-value bit, and a result of a bitwise left shift the unrestricted bitmask by one bit. In some embodiments, other filtering criteria may be used.

Left intermediate data is obtained at 4300. Obtaining the left intermediate data may include evaluating or otherwise processing the data-query, or a portion thereof to identify a data source for the left intermediate data. For example, the join clause, as a part of the data-query, may identify a first data source, such as a table stored in the distributed low-latency database or tabular data generated by the distributed low-latency database in accordance with another data-query, which may be a sub-query of the current data-query. For simplicity, the first data source may be referred to herein as a left table. A data-query that omits a join clause may otherwise identify a first data source. The join clause may indicate a column from the left table as a left join key column. The per-row values of the left join key column may unique within the left join key column within the left table. For example, the first data source, corresponding to the left table, may be tabular data generated such that the per-row values of the left join key column are unique within the left join key column within the left table.

Although not shown expressly in FIG. 4, the data-query may include a grouping clause associated with the first data source, corresponding to the left table, and indicating grouping by the column (grouping column) indicated as the left join key column in the join clause, and obtaining the left intermediate data may include obtaining the left intermediate data in accordance with the grouping clause. The grouping clause may indicate other columns for grouping, such as subsequent to the column indicated as the left join key column in the join clause. Obtaining the left intermediate data in accordance with the grouping clause may include obtaining the left table by grouping data, such as rows, from the first source table based on values for the grouping column such that values of the grouping column in the left table, which may be non-unique in the first source table, are unique within the left table. Obtaining the left intermediate data in accordance with the grouping clause may include generating data for one or more columns of the left table, such as by aggregating values from a column, other than the grouping column, such as on a per-group basis.

Figure 5:
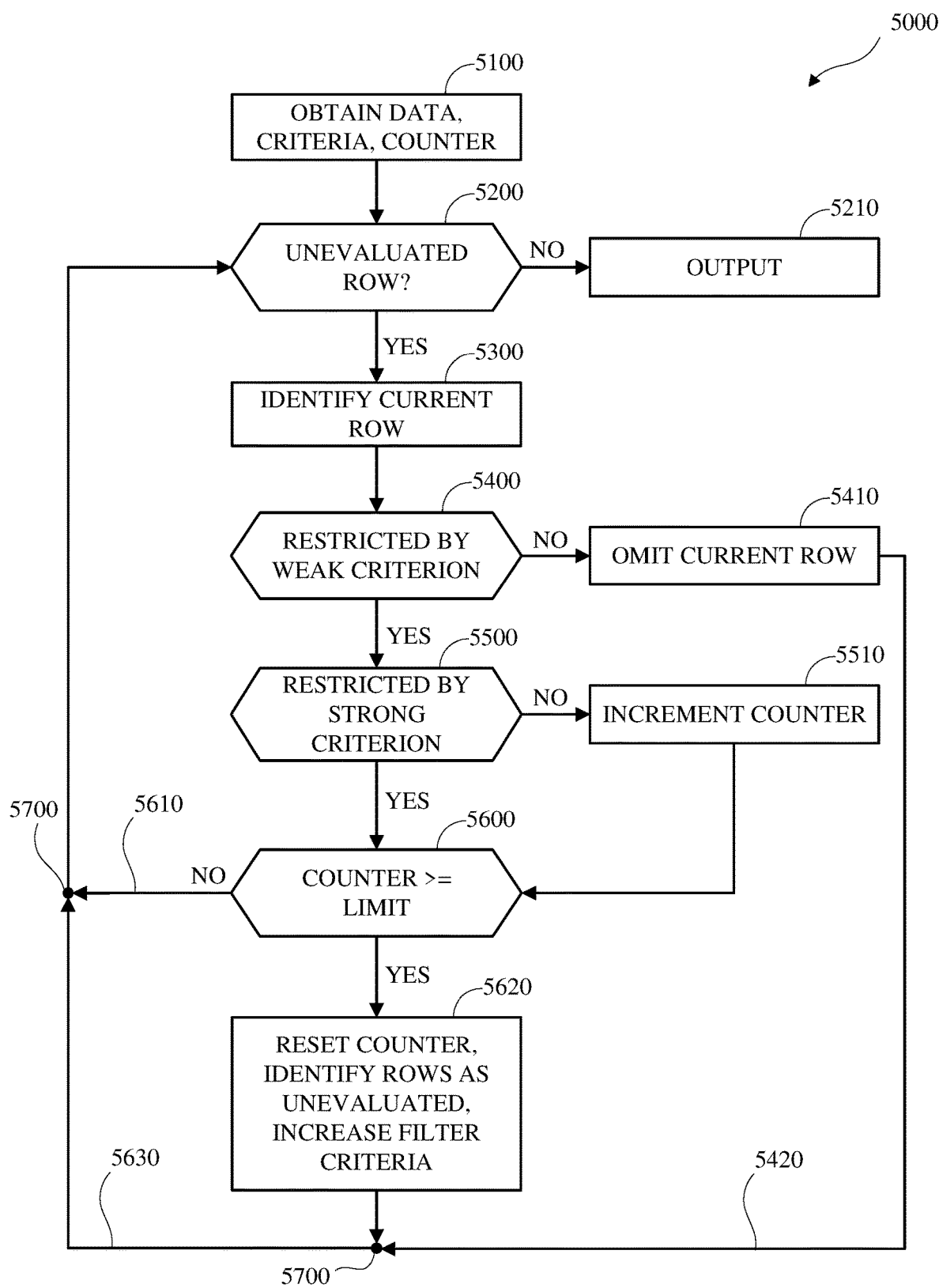
FIG. 5 is a flowchart of an example of a method of pseudo-random filtering in a distributed in-memory database.

Obtaining the left intermediate data at 4300 may include pseudo-random filtering the left table at 4900 to obtain the left intermediate data and a left filter criterion, such as a left bitmask. Pseudo-random filtering the left table at 4900 may include using the unrestricted bitmask as a weak bitmask. Pseudo-random filtering the left table at 4900 may include using the restricted bitmask as a strong bitmask. Pseudo-random filtering the left table at 4900 may include using a first counter as a current counter. For example, the first counter may be an integer value having a value, prior to pseudo-random filtering the left table, such as zero. Pseudo-random filtering the left table at 4900 may include using the left table, or data from the left table as candidate data, which may include using the left join key column as a target column. An example of pseudo-random filtering is shown in FIG. 5.

In some embodiments, the left table may include fewer rows than the limit value, the left table may be identified as the left intermediate data, and the unrestricted bitmask may be identified as the left bitmask. In some embodiments, the cardinality, or number, of rows in the left intermediate data may be the minimum cardinality of rows greater than or equal to the limit value. Limiting the left intermediate data in accordance with the limit clause, such as by limiting the left intermediate data to at most the limit value rows, may be inaccurate.

Right intermediate data is obtained at 4400. Obtaining the right intermediate data may include evaluating or otherwise processing the data-query, or a portion thereof to identify a data source for the right intermediate data. For example, the join clause, as a part of the data-query, may identify a second data source, such as a table stored in the distributed low-latency database or tabular data generated by the distributed low-latency database in accordance with another data-query, which may be a sub-query of the current data-query. For simplicity, the second data source may be referred to herein as a right table. A data-query that omits a join clause may omit identifying the right table and obtaining the right intermediated data at 4400 may be omitted. The per-row values of the right join key column may unique within the right join key column within the right table. For example, the second data source, corresponding to the right table, may be tabular data generated such that the per-row values of the right join key column are unique within the right join key column within the right table.

Although not shown expressly in FIG. 4, the data-query may include a grouping clause associated with the second data source, corresponding to the right table, and indicating grouping by the column (grouping column) indicated as the right join key column in the join clause, and obtaining the right intermediate data may include obtaining the right intermediate data in accordance with the grouping clause. The grouping clause may indicate other columns for grouping, such as subsequent to the column indicated as the right join key column in the join clause. Obtaining the right intermediate data in accordance with the grouping clause may include obtaining the right table by grouping data, such as rows, from the second source table based on values for the grouping column such that values of the grouping column in the right table, which may be non-unique in the second source table, are unique within the right table. Obtaining the right intermediate data in accordance with the grouping clause may include generating data for one or more columns of the right table, such as by aggregating values from a column, other than the grouping column, such as on a per-group basis. In some implementations, the first source table may be the second source table.

Obtaining the right intermediate data at 4400 may include pseudo-random filtering the right table at 4900 to obtain the right intermediate data and a right filter criterion, such as a right bitmask. Pseudo-random filtering the right table at 4900 may include using the unrestricted bitmask as a weak bitmask. Pseudo-random filtering the right table at 4900 may include using the restricted bitmask as a strong bitmask. Pseudo-random filtering the right table at 4900 may include using a second counter as the current counter. For example, the second counter may be an integer value having a value, prior to pseudo-random filtering the right table, such as zero. Pseudo-random filtering the right table at 4900 may include using right left table, or data from the right table as candidate data, which may include using the right join key column as a target column. An example of pseudo-random filtering is shown in FIG. 5.

In some embodiments, the right table may include fewer rows than the limit value, the right table may be identified as the right intermediate data, and the unrestricted bitmask may be identified as the right bitmask. In some embodiments, the cardinality, or number, of rows in the right intermediate data may be the minimum cardinality of rows greater than or equal to the limit value. Limiting the right intermediate data in accordance with the limit clause, such as by limiting the right intermediate data to at most the limit value rows, may be inaccurate.

Although pseudo-random filtering at 4900 is shown as one block in FIG. 4, pseudo-random filtering the left table may be independent from and concurrent, or substantially concurrent, with pseudo-random filtering the right table.

A most-restrictive filter criterion, such as a most-restrictive bitmask, is identified at 4500. The most-restrictive filter criteria, such as the most-restrictive bitmask, may be identified among the left filter criteria, such as the left bitmask, and the right filter criteria, such as the right bitmask. For example, the most-restrictive bitmask may be identified as a result of a bitwise logical OR of the left bitmask and the right bitmask. The most-restrictive bitmask may be the bitmask, among the left bitmask and the right bitmask, having the smallest cardinality, or number, of one-value bits, such as one-value trailing bits. For example, the left bitmask may be 00000001 and the right bitmask may be 00000011, and the most-restrictive bitmask may be identified as 00000011. In another example, the left bitmask may be 00001111 and the right bitmask may be 00000111, and the most-restrictive bitmask may be identified as 00001111. In some embodiments, the data-query may omit the join clause and the indication of the second data source and identifying the most-restrictive bitmask may be omitted or the left bitmask may be identified as the most-restrictive bitmask.

Intermediate results data is obtained at 4600. Obtaining the intermediate results data includes combining, such as by joining, the left intermediate data and the right intermediate data. The join clause may describe combining the data, such as rows, from left table with the data, such as rows, from the right table. Executing, or otherwise processing, the data-query may include combining the data from the left table with the data from the right table by matching values from the left join key column with values from the right join key column. The join clause may be a full outer join clause indicating that rows from the left table for which values from the left join key column are unmatched with values from the right join key column may be included in the results data and indicating that rows from the right table for which values from the left join key column are unmatched with values from the right join key column may be included in the results data. In some embodiments, the data-query may omit the join clause and the indication of the second data source and the left intermediate data obtained at 4300 may be identified as the intermediate results data.

The results data is obtained by filtering the intermediate results data at 4700 using the most-restrictive bitmask obtained at 4600. Obtaining the results data may include, for a respective row from the intermediate results data, determining whether to include the row in the results data. Determining whether to include the row in the results data may include, for a respective row from the intermediate results data, determining whether the hash value for the row is restricted by the most-restrictive bitmask. Determining whether the hash value for the row is restricted by the most-restrictive bitmask may include determining a result of a bitwise logical AND of the hash value for the row and the most-restrictive bitmask. In response to determining that the result of the bitwise logical AND of the hash value for the row and the most-restrictive bitmask is false, or zero (0), the row may be included in the results data. In response to determining that the result of the bitwise logical AND of the hash value for the row and the most-restrictive bitmask is true, or one (1), the row may be omitted from the results data. Prior to obtaining the results data at 4700, the rows of the intermediate results data may be identified as unevaluated rows. Subsequent to including a row from the intermediate results data in the results data, the row may be identified as an evaluated row or may be omitted from the intermediate results data. Subsequent to omitting a row from the results data, the row may be identified as an evaluated row or may be omitted from the intermediate results data. Obtaining the results data may include determining whether the intermediate results data includes an unevaluated row. In response to determining that the intermediate results data includes an unevaluated row, obtaining the results data may include, determining whether to include the row in the results data.

The results data is output at 4800. For example, the results data may be output at 4800 in response to determining that the intermediate results data includes omits unevaluated rows. Outputting the results data at 4800 may include outputting the results data as tabular data to another data-query, or another portion of the current data-query. In some embodiments, outputting the results data at 4800 may include outputting the results data, or a portion thereof, for presentation to a user.

Outputting the results data at 4800 includes limiting the results data in accordance with the join clause. For example, the cardinality of rows in the results data may be greater than the limit value indicated in the join clause, and outputting the results data may include omitting one or more rows from the results data such that the cardinality of rows of the results data is the limit clause value. In some embodiments, the cardinality of rows in the results data may be less than or equal to the limit value and omitting rows in accordance with the limit clause may be otherwise omitted.

In some embodiments, the data-query may include an ordering clause. The ordering clause, such as an 'order by' clause, may indicate that execution of the data-query data includes generating results data such that elements, such as rows, of the results data are ordered in accordance with ordering criteria indicated in the ordering clause. The ordering criteria may indicate an ordered sequence of one or more columns, such as a first column from the first table and a second column from the second table, such that execution of the data-query data includes generating results data such that elements, such as rows, of the results data are ordered in accordance with the values of the first column and in accordance with the values of the second column, wherein ordering in accordance with the values of the second column preserves the ordering in accordance with the values of the first column. Distributed pseudo-random subset generation 4000 for a data-query including an ordering clause may omit obtaining filter criteria at 4200. Distributed pseudo-random subset generation 4000 for a data-query including an ordering clause may omit pseudo-random filtering at 4900. A data-query may include an ordering clause and obtaining the left intermediate data at 4300 may include obtaining the left intermediate data ordered in accordance with the ordering criteria associated with the first table and limited in accordance with the limit value, such that the left intermediate data may include an ordered dataset having a cardinality of, at most, the limit value. For example, the ordering clause may indicate ordering by a first column of the first table obtaining the left intermediate data at 4300 may include obtaining the left intermediate data ordered in accordance with values of the first column and limited in accordance with the limit value. The data-query may include an ordering clause and obtaining the right intermediate data at 4400 may include obtaining the right intermediate data ordered in accordance with the ordering criteria associated with the right table and limited in accordance with the limit value, such that the right intermediate data may include an ordered dataset having a cardinality of, at most, the limit value. For example, the ordering clause may indicate ordering by a second column of the second table obtaining the right intermediate data at 4400 may include obtaining the right intermediate data ordered in accordance with values of the second column and limited in accordance with the limit value. Distributed pseudo-random subset generation 4000 for a data-query including an ordering clause may omit identifying most-restrictive filter criteria at 4500. The data-query may include an ordering clause and filtering the intermediate results data at 4700 may include ordering (partial ordering) the intermediate results data in accordance with the first ordering criterion, as indicated in the ordering clause, such as by values corresponding to the first column from the left intermediate data, and, ordering the partially ordered intermediate results data in accordance with the second ordering criterion, as indicated in the ordering clause, such as by values corresponding to the second column from the right intermediate data. In some embodiments, the ordering clause may indicate the ordering criteria such that the ordered data is ordered in accordance with available, such as not null, values corresponding to the first ordering criterion, such as the first column, and such that elements, such as rows, from the intermediate results data for which values corresponding to the first ordering criterion, such as values for the first column, are unavailable, such as null, are ordered in accordance with the second ordering criterion.

FIG. 5 is a flowchart of an example of a method of pseudo-random filtering 5000 in a distributed in-memory database instance. Pseudo-random filtering 5000 may be implemented in a low-latency data analysis system, such as the low-latency data analysis system 3000 shown in FIG. 3, including a distributed in-memory database, such as the distributed in-memory database 3300 shown in FIG. 3. For example, the pseudo-random filtering shown at 4900 may include the pseudo-random filtering 5000 shown in FIG. 5.

Pseudo-random filtering 5000 includes filtering candidate data, by removing or omitting some data, such as one or more rows, based on filtering criteria. Prior to pseudo-random filtering 5000 the candidate data includes an amount of data, such as a cardinality of rows, that may be greater than, equal to, or less than an amount of data indicated by a defined limit value (K) or threshold. The candidate data includes a target data portion, such as a target column. Respective elements of the candidate data, such as respective rows, have unique values within the target data portion, such as within the target column. Subsequent to pseudo-random filtering 5000 the candidate data may include a smaller amount of data, such as fewer rows. For embodiments wherein the candidate data includes an amount of data, such as a carnality of rows, greater than or equal to the limit value pseudo-random filtering 5000 may obtain candidate data filtered such that the cardinality of rows in the candidate data subsequent to pseudo-random filtering 5000 is greater than or equal to the limit value and, above the limit value, is otherwise minimized, such that pseudo-random filtering 5000 identifies the filtering criteria that corresponds with obtaining the minimum cardinality of rows that includes at least the limit value number of rows.

In some embodiments, prior to pseudo-random filtering 5000 the candidate data may include an amount of data, such as a cardinality of rows, that is less than the limit value, pseudo-random filtering 5000 may include determining that the candidate data includes an amount of data, such as a cardinality of rows, that is less than the limit value, and pseudo-random filtering 5000 may be otherwise omitted.

Pseudo-random filtering 5000 includes obtaining candidate data, filtering criteria, and a counter at 5100, determining whether the candidate data includes unevaluated data at 5200, identifying unevaluated data as current data at 5300, determining whether the current data is restricted by a weak criterion at 5400, determining whether the current data is restricted by a strong criterion at 5500, and determining whether the counter is at least the limit value at 5600.

Candidate data is obtained at 5100. Obtaining the candidate data may include obtaining tabular data, such as data from a table stored in the distributed in-memory database, as the candidate data. For example, the tabular data from the left table described at 4300 in FIG. 4 may be obtained as the candidate data. In another example, the tabular data from the right table described at 4400 in FIG. 4 may be obtained as the candidate data. In another example, candidate data previously used by pseudo-random filtering 5000 may be obtained as the candidate data. The candidate data includes at least one column and obtaining the candidate data includes identifying a column from the candidate data as a target column. Values of the target column may be unique within the target column for the candidate data. In some embodiments, obtaining the candidate data may include obtaining data generated in accordance with a grouping clause, such as described with respect to FIG. 4.

Filtering criteria is obtained at 5100. In some embodiments, the filtering criteria obtained at 5100 may be the filtering criteria described with reference to 4200 in FIG. 4. Obtaining the filtering criteria may include obtaining a weak filtering criterion. For example, the weak filtering criterion may be a weak bitmask, such as the unrestricted bitmask described with reference to 4200 in FIG. 4. Obtaining the filtering criteria may include obtaining a strong filtering criterion. For example, the strong filtering criterion may be a strong bitmask, such as the restricted bitmask described with reference to 4200 in FIG. 4.

A counter is obtained at 5100. For example, the counter may be an integer variable and obtaining the counter may include obtaining a value of the counter as zero (0). Other counters may be used.

Whether the candidate data includes unevaluated data may be determined at 5200. In some embodiments, the candidate data obtained at 5100 may include an index column, obtaining the candidate data at 5100 may include obtaining a current pointer to an index position with respect to the index column, and determining whether the candidate data includes unevaluated data may include determining whether the current index position indicates the maximum index position in the candidate data. The current index position may indicate the maximum index position in the candidate data and determining whether the candidate data includes unevaluated data at 5200 may determine that the candidate data omits unevaluated data and the candidate data and the weak criterion may be output at 5210. The current index position may be less than the maximum index position in the candidate data and determining whether the candidate data includes unevaluated data at 5200 may determine that the candidate data includes unevaluated data. In some embodiments, a respective bit, or other flag, may be associated with a respective row from the candidate data and may indicate whether the respective row is evaluated or unevaluated. In some embodiments, determining whether the candidate data includes unevaluated data may include otherwise obtaining data indicating whether the candidate data includes unevaluated data.

Unevaluated data may be identified as current data at 5300. For example, an unevaluated row may be identified as a current row at 5300, such as in response to determining that the candidate data includes unevaluated data at 5200. Identifying the current data at 5300 may include obtaining a value from the current data corresponding to the target column. Identifying the current data at 5300 may include obtaining a current hash value corresponding to the value from the target column of the current data using a defined hashing function. The defined hashing function may be consistent among instances of the distributed in-memory database, such that the hash value obtained for a target value using the defined hashing function at a first instance of the distributed in-memory database matches the hash value obtained for a target value using the defined hashing function at a second instance of the distributed in-memory database.

Identifying the current data at 5300 may include identifying the current row as an evaluated row. For example, identifying the current row as an evaluated row may include obtaining a bit or flag associated with the current row indicating that the current row is an evaluated row. In another example, identifying the current row as an evaluated row may include storing, or otherwise maintaining, a pointer, or other identifier, indicating the position of the current row in the table.

Whether the current data is restricted by the weak criterion may be determined at 5400. Determining whether the current data is restricted by the weak criterion may include determining a result of a bitwise logical AND of the current hash value and the weak bitmask. For example, the result of the bitwise logical AND of the current hash value and the weak bitmask may be false, or zero (0), and the current row may be identified as unrestricted by the weak bitmask. In some embodiments, in response to determining that a current row is unrestricted by the weak bitmask, the current row may be stored, such as in-memory, as unrestricted candidate data. In another example, the result of the bitwise logical AND of the current hash value and the weak bitmask may be true, or one (1), and the current row may be identified as restricted by the weak bitmask.

The current data, such as the current row, may be omitted from the candidate data at 5410. For example, determining whether the current data is restricted by the weak criterion at 5400 may include determining that the current data is restricted by the weak criterion and, in response, the current data may be omitted from the candidate data at 5410. Subsequent to omitting the current row at 5410, pseudo-random filtering may be performed using the weak bitmask, the strong bitmask, the current counter, and the candidate data as indicated by the directional arrow at 5420. Data, such as rows, omitted from the candidate data remain omitted from the candidate data. In some embodiments, the strong filtering criterion may be unavailable, such as omitted from the filtering criteria, and pseudo-random filtering may be performed using the weak bitmask, the current counter, and the candidate data as indicated by the directional arrow at 5420.

Whether the current data is restricted by the strong criterion may be determined at 5500. Determining whether the current data is restricted by the strong criterion may include determining a result of a bitwise logical AND of the current hash value and the strong bitmask. For example, the result of the bitwise logical AND of the current hash value and the strong bitmask may be false, or zero (0), and the current row may be identified as unrestricted by the strong bitmask. In another example, the result of the bitwise logical AND of the current hash value and the strong bitmask may be true, or one (1), and the current row may be identified as restricted by the strong bitmask.

Determining whether the current data is restricted by the strong criterion may determine that the current data is restricted by the strong criterion at 5500 and the counter may be incremented, such as by one, at 5510. Determining whether the current data is restricted by the strong criterion may determine that the current data is unrestricted by the strong criterion at 5500 and incrementing the current counter at 5510 may be omitted.

In some embodiments, the strong filtering criterion may be unavailable, such as omitted from the filtering criteria, determining whether the current data is restricted by the strong criterion at 5500 may be omitted, and the counter may be incremented at 5510 in response to determining that the current data is unrestricted by the weak criterion at 5400.

Whether the current counter is at least, such as greater than or equal to, the limit value may be determined at 5600. The current counter may be within, such as less than, the limit value and pseudo-random filtering may be performed using the weak bitmask, the strong bitmask, the current counter, and the candidate data as indicated by the directional arrow at 5610. In some embodiments, the strong filtering criterion may be unavailable, such as omitted from the filtering criteria, and pseudo-random filtering may be performed using the weak bitmask, the current counter, and the candidate data as indicated by the directional arrow at 5610.

In response to determining that the current counter is at least, such as greater than or equal to, the limit value at 5600, the current counter may be reset, such as to zero (0) at 5620.

In response to determining that the current counter is at least, such as greater than or equal to, the limit value at 5600, the candidate data, other than data omitted from the candidate data, may be identified as unevaluated data at 5620. For example, the rows of the candidate data may be identified as unevaluated rows. Data, such as rows, omitted from the candidate data remain omitted from the candidate data.

In response to determining that the current counter is at least, such as greater than or equal to, the limit value at 5600, the filtering criteria may be increased at 5620. Increasing the filtering criteria may include identifying the strong bitmask as the weak bitmask. Increasing the filtering criteria may include identifying, as the strong bitmask, a sum of one (1), or a binary one-value bit, and a result of a bitwise left shift of the strong bitmask by one bit. For example, prior to incrementing the filtering criteria, the weak bitmask may be 00000000 and the strong bitmask may be 00000001, and subsequent to incrementing the filtering criteria the weak bitmask may be 00000001 and the strong bitmask may be 00000011. In some embodiments, the strong filtering criterion may be unavailable, such as omitted from the filtering criteria, and increasing the filtering criteria may include identifying, as the weak bitmask, a sum of one (1), or a binary one-value bit, and a result of a bitwise left shift of the weak bitmask by one bit.

Subsequent to increasing the filtering criteria, resetting the counter, and identifying the candidate data as unevaluated data at 5620, pseudo-random filtering may be performed using the weak bitmask (as increased), the strong bitmask (as increased), the current counter (as reset), and the candidate data as indicated by the directional arrow at 5630. Data, such as rows, omitted from the candidate data remain omitted from the candidate data. In some embodiments, the strong filtering criterion may be unavailable, such as omitted from the filtering criteria, and pseudo-random filtering may be performed using the weak bitmask (as increased), the current counter (as reset), and the candidate data as indicated by the directional arrow at 5630.

The solid circles 5700 are shown for clarity and are not limiting. Performing pseudo-random filtering 5000, wherein pseudo-random filtering 5000 includes performing pseudo-random filtering, as indicated at 5420 and 5610, which omits resetting the counter, identifying rows as unevaluated, and incrementing the filtering criteria as shown at 5620, may correspond with performing pseudo-random filtering 5000 by iterating through the rows of the candidate data. Performing pseudo-random filtering 5000, wherein pseudo-random filtering 5000 includes performing pseudo-random filtering 5000 subsequent to resetting the counter, identifying rows as unevaluated, and incrementing the filtering criteria as shown at 5620, as shown at 5630, may correspond with performing an ordered sequence of iterations of pseudo-random filtering 5000, wherein each iteration filters the candidate data to obtain a subset of the candidate data.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine," "identify," "obtain," and "form" or any variations thereof, includes selecting, ascertaining, computing, looking up, receiving, determining, establishing, obtaining, or otherwise identifying or determining in any manner whatsoever using one or more of the devices and methods shown and described herein.

As used herein, the term "computing device" includes any unit, or combination of units, capable of performing any method, or any portion or portions thereof, disclosed herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Attributes may comprise any data characteristic, category, content, etc. that in one example may be non-quantifiable or non-numeric. Measures may comprise quantifiable numeric values such as sizes, amounts, degrees, etc. For example, a first column containing the names of states may be considered an attribute column and a second column containing the numbers of orders received for the different states may be considered a measure column.

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, such as a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
in response to receiving data expressing a usage intent with respect to a low-latency data analysis system, wherein the low-latency data analysis system includes a distributed in-memory database:

obtaining, by the distributed in-memory database, a
portion of a data query responsive to the data
expressing the usage intent, wherein the portion of
the data query indicates:
a first table including a first column; and
a limit value;
obtaining, by the distributed in-memory database,
results data, wherein obtaining the results data
includes:
obtaining filtering criteria;
pseudo-random filtering the first table using the
filtering criteria and using, as candidate data, data
from the first table, which includes using the first
column as a target column;
in response to the pseudo-random filtering of the first
table, obtaining the candidate data as intermediate
results data; and
obtaining, as the results data, rows from the inter-
mediate results data such that a cardinality of rows
of the results data is at most the limit value; and
outputting the results data as responsive to the por-
tion of the data query.

2. The method of claim 1, wherein the pseudo-random filtering includes:
using a first counter as a current counter; and
in response to a determination that the candidate data
includes an unevaluated row:
identifying the unevaluated row as a current row,
wherein the current row includes a current value for
the target column, wherein the current value is
unique within the target column;
identifying the current row as an evaluated row;
obtaining a current hash value as a result of performing
a defined hashing function on the current value;
in response to a determination that the current hash
value is restricted by the filtering criteria, omitting
the current row from the candidate data; and
in response to a determination that the current hash
value is unrestricted by the filtering criteria:
incrementing the current counter;
in response to a determination that the current coun-
ter is at least the limit value:
resetting the current counter;
identifying rows of the candidate data as unevalu-
ated rows; and
obtaining, as the filtering criteria, minimally more
restrictive filtering criteria; and
pseudo-random filtering the candidate data using the
filtering criteria, the current counter, and the candi-
date data.

3. The method of claim 2, wherein:
obtaining the filtering criteria includes:
obtaining an unrestricted bitmask; and
obtaining a restricted bitmask that is minimally more
restrictive than the unrestricted bitmask;
pseudo-random filtering the first table using the filtering
criteria includes pseudo-random filtering the first table
using the unrestricted bitmask as a weak bitmask and
the restricted bitmask as a strong bitmask;
the determination that the current hash value is restricted
by the filtering criteria includes a determination that the
current hash value is restricted by the weak bitmask;
incrementing the current counter includes incrementing
the current counter in response to a determination that
the current hash value is restricted by the strong bit-
mask;

obtaining, as the filtering criteria, the minimally more
restrictive filtering criteria includes, in response to
identifying the strong bitmask as the weak bitmask,
obtaining, as the strong bitmask, a more-restricted
bitmask that is minimally more restrictive than the
weak bitmask; and
pseudo-random filtering the candidate data includes
pseudo-random filtering the candidate data using the
weak bitmask, the strong bitmask, the current counter,
and the candidate data.

4. The method of claim 3, wherein:
the determination that the current hash value is restricted
by the weak bitmask is responsive to a determination
that a result of a bitwise logical AND of the current
hash value and the weak bitmask is one; and
the determination that the current hash value is unre-
stricted by the weak bitmask is responsive to a deter-
mination that the result of the bitwise logical AND of
the current hash value and the weak bitmask is zero.

5. The method of claim 3, wherein:
the determination that the current hash value is unre-
stricted by the strong bitmask is responsive to a deter-
mination that a result of a bitwise logical AND of the
current hash value and the strong bitmask is zero.

6. The method of claim 3, wherein:
obtaining the restricted bitmask includes obtaining, as the
restricted bitmask, a sum of one and a result of a bitwise
left shift of the unrestricted bitmask by one bit; and
obtaining, as the strong bitmask, the more-restricted bit-
mask includes obtaining, as the strong bitmask, a sum
of one and a result of a left shift of the weak bitmask
by one bit.

7. The method of claim 2, wherein the portion of the data
query indicates a grouping clause with respect to the first
column, the method further comprising:
obtaining the first table by grouping rows from a first
source table from the distributed in-memory database,
such that a row from the first table having a first value
for the first column represents a group of rows from the
first source table that have the first value for a corre-
sponding column.

8. The method of claim 2, wherein:
the portion of the data query indicates:
a second table including a second column; and
a join clause indicating a full outer join of the first table
and the second table on the first column and the
second column; and
obtaining the results data includes:
pseudo-random filtering the second table using the
filtering criteria, a second counter as the current
counter, and data from the second table as the
candidate data, which includes using the second
column as the target column;
in response to pseudo-random filtering the first table:
omitting obtaining the candidate data as the inter-
mediate results data; and
obtaining the candidate data as left intermediate data
and obtaining the filtering criteria as left filtering
criteria;
in response to pseudo-random filtering the second
table, obtaining the candidate data as right interme-
diate data and the filtering criteria as right filtering
criteria;
identifying most-restrictive filtering criteria among the
left filtering criteria and the right filtering criteria;
and obtaining the intermediate results data by filtering, using the most-restrictive filtering criteria, a result of full outer joining the left intermediate data and the right intermediate data on the first column and the second column.

9. The method of claim 8, wherein the portion of the data query indicates a grouping clause with respect to the second column, the method further comprising:
obtaining the second table by grouping rows from a second source table, such that a row from the second table having a second value for the second column represents a group of rows from the second source table that have the second value for a corresponding column.

10. The method of claim 8, wherein identifying the most-restrictive filtering criteria includes identifying, as the most-restrictive filtering criteria, a result of a bitwise logical OR of the left filtering criteria and the right filtering criteria.

11. An apparatus comprising:
a memory; and
a processor configured to execute instructions stored in the memory to:
in response to receiving data expressing a usage intent with respect to a low-latency data analysis system, wherein the low-latency data analysis system includes a distributed in-memory database:
obtain, by the distributed in-memory database, a portion of a data query responsive to the data expressing the usage intent, wherein the portion of the data query indicates:
a first table including a first column; and
a limit value;
obtain, by the distributed in-memory database, results data, wherein to obtain the results data includes:
obtaining filtering criteria;
pseudo-random filtering the first table using the filtering criteria and using, as candidate data, data from the first table, which includes using the first column as a target column;
in response to the pseudo-random filtering of the first table, obtaining the candidate data as intermediate results data; and
obtaining, as the results data, rows from the intermediate results data such that a cardinality of rows of the results data is at most the limit value; and
output the results data as responsive to the portion of the data query.

12. The apparatus of claim 11, wherein the pseudo-random filtering includes:
using a first counter as a current counter; and
in response to a determination that the candidate data includes an unevaluated row:
identifying the unevaluated row as a current row, wherein the current row includes a current value for the target column, wherein the current value is unique within the target column;
identifying the current row as an evaluated row;
obtaining a current hash value as a result of performing a defined hashing function on the current value;
in response to a determination that the current hash value is restricted by the filtering criteria, omitting the current row from the candidate data; and
in response to a determination that the current hash value is unrestricted by the filtering criteria:
incrementing the current counter;
in response to a determination that the current counter is at least the limit value:
resetting the current counter;
identifying rows of the candidate data as unevaluated rows; and
obtaining, as the filtering criteria, minimally more restrictive filtering criteria; and
pseudo-random filtering the candidate data using the filtering criteria, the current counter, and the candidate data.

13. The apparatus of claim 12, wherein:
obtaining the filtering criteria includes:
obtaining an unrestricted bitmask; and
obtaining a restricted bitmask that is minimally more restrictive than the unrestricted bitmask;
pseudo-random filtering the first table using the filtering criteria includes pseudo-random filtering the first table using the unrestricted bitmask as a weak bitmask and the restricted bitmask as a strong bitmask;
the determination that the current hash value is restricted by the filtering criteria includes a determination that the current hash value is restricted by the weak bitmask;
incrementing the current counter includes incrementing the current counter in response to a determination that the current hash value is restricted by the strong bitmask;
obtaining, as the filtering criteria, the minimally more restrictive filtering criteria includes, in response to identifying the strong bitmask as the weak bitmask, obtaining, as the strong bitmask, a more-restricted bitmask that is minimally more restrictive than the weak bitmask; and
pseudo-random filtering the candidate data includes pseudo-random filtering the candidate data using the weak bitmask, the strong bitmask, the current counter, and the candidate data.

14. The apparatus of claim 13, wherein:
the determination that the current hash value is restricted by the weak bitmask is responsive to a determination that a result of a bitwise logical AND of the current hash value and the weak bitmask is one; and
the determination that the current hash value is unrestricted by the weak bitmask is responsive to a determination that the result of the bitwise logical AND of the current hash value and the weak bitmask is zero.

15. The apparatus of claim 13, wherein:
the determination that the current hash value is unrestricted by the strong bitmask is responsive to a determination that a result of a bitwise logical AND of the current hash value and the strong bitmask is zero.

16. The apparatus of claim 12, wherein:
the portion of the data query indicates:
a second table including a second column; and
a join clause indicating a full outer join of the first table and the second table on the first column and the second column; and
obtaining the results data includes:
pseudo-random filtering the second table using the filtering criteria, a second counter as the current counter, and data from the second table as the candidate data, which includes using the second column as the target column;
in response to pseudo-random filtering the first table:
omitting obtaining the candidate data as the intermediate results data; and obtaining the candidate data as left intermediate data and obtaining the filtering criteria as left filtering criteria;

in response to pseudo-random filtering the second table, obtaining the candidate data as right intermediate data and the filtering criteria as right filtering criteria;

identifying most-restrictive filtering criteria among the left filtering criteria and the right filtering criteria; and obtaining the intermediate results data by filtering, using the most-restrictive filtering criteria, a result of full outer joining the left intermediate data and the right intermediate data on the first column and the second column.

17. A non-transitory computer-readable storage medium including executable instructions which when executed by one or more processors cause the one or more processors to perform operations comprising:

in response to receiving data expressing a usage intent with respect to a low-latency data analysis system, wherein the low-latency data analysis system includes a distributed in-memory database:

obtaining, by the distributed in-memory database, a portion of a data query responsive to the data expressing the usage intent, wherein the portion of the data query indicates:

a first table including a first column; and a limit value;

obtaining, by the distributed in-memory database, results data, wherein obtaining the results data includes:

obtaining filtering criteria;

pseudo-random filtering the first table using the filtering criteria and using, as candidate data, data from the first table, which includes using the first column as a target column;

in response to the pseudo-random filtering of the first table, obtaining the candidate data as intermediate results data; and obtaining, as the results data, rows from the intermediate results data such that a cardinality of rows of the results data is at most the limit value; and outputting the results data as responsive to the portion of the data query.

18. The computer-readable storage medium of claim 17, wherein the pseudo-random filtering includes:

using a first counter as a current counter; and in response to a determination that the candidate data includes an unevaluated row:

identifying the unevaluated row as a current row, wherein the current row includes a current value for the target column, wherein the current value is unique within the target column;

identifying the current row as an evaluated row;

obtaining a current hash value as a result of performing a defined hashing function on the current value;

in response to a determination that the current hash value is restricted by the filtering criteria, omitting the current row from the candidate data; and in response to a determination that the current hash value is unrestricted by the filtering criteria:

incrementing the current counter;

in response to a determination that the current counter is at least the limit value:

resetting the current counter;

identifying rows of the candidate data as unevaluated rows; and obtaining, as the filtering criteria, minimally more restrictive filtering criteria; and pseudo-random filtering the candidate data using the filtering criteria, the current counter, and the candidate data.

19. The computer-readable storage medium of claim 18, wherein:

obtaining the filtering criteria includes:

obtaining an unrestricted bitmask; and obtaining a restricted bitmask that is minimally more restrictive than the unrestricted bitmask;

pseudo-random filtering the first table using the filtering criteria includes pseudo-random filtering the first table using the unrestricted bitmask as a weak bitmask and the restricted bitmask as a strong bitmask;

the determination that the current hash value is restricted by the filtering criteria includes a determination that the current hash value is restricted by the weak bitmask;

incrementing the current counter includes incrementing the current counter in response to a determination that the current hash value is restricted by the strong bitmask;

obtaining, as the filtering criteria, the minimally more restrictive filtering criteria includes, in response to identifying the strong bitmask as the weak bitmask, obtaining, as the strong bitmask, a more-restricted bitmask that is minimally more restrictive than the weak bitmask; and pseudo-random filtering the candidate data includes pseudo-random filtering the candidate data using the weak bitmask, the strong bitmask, the current counter, and the candidate data.

20. The computer-readable storage medium of claim 18, wherein:

the portion of the data query indicates:

a second table including a second column; and a join clause indicating a full outer join of the first table and the second table on the first column and the second column; and obtaining the results data includes:

pseudo-random filtering the second table using the filtering criteria, a second counter as the current counter, and data from the second table as the candidate data, which includes using the second column as the target column;

in response to pseudo-random filtering the first table:

omitting obtaining the candidate data as the intermediate results data; and obtaining the candidate data as left intermediate data and obtaining the filtering criteria as left filtering criteria;

in response to pseudo-random filtering the second table, obtaining the candidate data as right intermediate data and the filtering criteria as right filtering criteria;

identifying most-restrictive filtering criteria among the left filtering criteria and the right filtering criteria; and obtaining the intermediate results data by filtering, using the most-restrictive filtering criteria, a result of full outer joining the left intermediate data and the right intermediate data on the first column and the second column.

* * * * *